United States Patent
Otani et al.

(10) Patent No.: US 11,528,237 B2
(45) Date of Patent: Dec. 13, 2022

(54) SERVER, SERVER SYSTEM, AND METHOD OF INCREASING NETWORK BANDWIDTH OF SERVER

(71) Applicant: Nippon Telegraph and Telephone Corporation, Tokyo (JP)

(72) Inventors: Ikuo Otani, Tokyo (JP); Noritaka Horikome, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/266,797

(22) PCT Filed: Jul. 25, 2019

(86) PCT No.: PCT/JP2019/029258
§ 371 (c)(1),
(2) Date: Feb. 8, 2021

(87) PCT Pub. No.: WO2020/031726
PCT Pub. Date: Feb. 13, 2020

(65) Prior Publication Data
US 2021/0320885 A1 Oct. 14, 2021

(30) Foreign Application Priority Data
Aug. 8, 2018 (JP) .............................. JP2018-149469

(51) Int. Cl.
*H04L 49/00* (2022.01)
*H04L 47/52* (2022.01)
*H04L 49/15* (2022.01)
*H04L 49/45* (2022.01)

(52) U.S. Cl.
CPC .......... *H04L 49/3045* (2013.01); *H04L 47/52* (2013.01); *H04L 49/1507* (2013.01); *H04L 49/45* (2013.01); *H04L 49/70* (2013.01)

(58) Field of Classification Search
CPC . H04L 49/3045; H04L 47/52; H04L 49/1507; H04L 49/45; H04L 49/70; H04L 45/56; H04L 45/586; H04L 45/60; G06F 9/45533; G06F 2009/45595
See application file for complete search history.

(56) References Cited

U.S. PATENT DOCUMENTS

| 2018/0109471 | A1* | 4/2018 | Chang | H04L 49/70 |
| 2019/0327177 | A1* | 10/2019 | Murugesan | H04L 47/2483 |
| 2020/0351222 | A1* | 11/2020 | Zakin | H04L 12/56 |
| 2021/0051097 | A1* | 2/2021 | Otani | H04L 45/42 |

FOREIGN PATENT DOCUMENTS

JP 2017-147488 8/2017

* cited by examiner

*Primary Examiner* — Mohamed A Kamara
(74) *Attorney, Agent, or Firm* — Fish & Richardson P.C.

(57) ABSTRACT

A server includes a normal NIC as an NIC having an expansion function, and a virtual patch panel having a transfer function of transferring packets between the normal NIC and an accelerator utilization type NIC, which is implemented by software. The server is configured such that, when a packet is transferred between the normal NIC and the accelerator utilization type NIC via the virtual patch panel, the target function transfers the packet to and from the APLs.

8 Claims, 19 Drawing Sheets

76 POLICY TABLE

| ATTRIBUTE | VALUE |
|---|---|
| SOFTWARE PERFORMANCE WEIGHT | 1 |
| CPU RESOURCE WEIGHT | 0.8 |
| PERFORMANCE SUITABILITY WEIGHT | 1.2 |

Fig. 11

77 THRESHOLD VALUE TABLE

| ATTRIBUTE | VALUE |
|---|---|
| PERFORMANCE THRESHOLD VALUE | 50Gbps |
| FIRST SUITABILITY THRESHOLD VALUE | 0.5 |
| SECOND SUITABILITY THRESHOLD VALUE | 0.5 |

Fig. 12

SERVER, SERVER SYSTEM, AND METHOD OF INCREASING NETWORK BANDWIDTH OF SERVER

CROSS-REFERENCE TO RELATED APPLICATIONS

This application is a National Stage application under 35 U.S.C. § 371 of International Application No. PCT/JP2019/029258, having an International Filing Date of Jul. 25, 2019, which claims priority to Japanese Application Serial No. 2018-149469, filed on Aug. 8, 2018. The disclosure of the prior application is considered part of the disclosure of this application, and is incorporated in its entirety into this application.

TECHNICAL FIELD

The present invention relates to a server, a server system, and a method of increasing a network bandwidth of a server, which can increase a network bandwidth in a general-purpose server to which an accelerator that shares a part of processing of a central processing unit (CPU) is applied.

BACKGROUND ART

A server includes a network interface card (NIC) in order to communicate with a communication device such as another server through packet transmission and reception. The NIC is a dedicated expansion board (called expansion function) for connecting the server to a communication network. FIG. 18 is a block diagram illustrating a configuration of a server 10 including an NIC of the related art. The server 10 includes an NIC 11, and a CPU 14 including an application (APL) 12 that is software for performing a target process and a packet processing unit 13.

The server 10 uses cores (arithmetic processing function) of the CPU 14 when the packet processing unit 13 processes packets input from the NIC 11. In this case, many cores are used only for packet processing, which reduces the number of cores capable of processing according to the activated APL 12.

Therefore, there is a type of server in which an accelerator utilization type NIC (also referred to as utilization type NIC) 15 to be described below is used, and a packet processing unit 13 is included in the utilization type NIC 15 to perform offload for load balancing, like a server 10A illustrated in FIG. 19. The accelerator utilization type NIC 15 is also called a smart NIC, in which an accelerator is configured on the NIC by a field-programmable gate array (FPGA) or the like serving as an integrated circuit in which an electronic circuit is variable. In the server 10A, the utilization type NIC 15 is caused to perform a role of packet processing, such that many cores of the CPU 14 are assigned to the APL 12 to enable speeding up.

An offload type server as described above includes a server 10B having a configuration illustrated in FIG. 20. In this server 10B, a utilization type NIC 15 having an NIC port 15a includes a target function 16 such as a D plane (a data transfer function), and an NIC 11 having an NIC port 11a is included separately from the utilization type NIC 15. Each of the NIC ports 11a and 15a has a network bandwidth of 40 Gbps (referred to as an NW bandwidth), for example.

In such a configuration, the server 10B performs a process of rewriting data in a packet input from the NIC port 15a of the utilization type NIC 15 using the target function 16 and performing distribution to target APLs 12a, 12b, and 12c according to the rewritten data. This type of technology is described in Patent Literature 1.

CITATION LIST

Patent Literature

Patent Literature 1: JP 2017-147488 A

SUMMARY OF THE INVENTION

Technical Problem

However, in the server 10B illustrated in FIG. 20 described above, the target function 16 can be accessed only by the NIC port 15a of the utilization type NIC 15. The target function 16 cannot be accessed from the NIC port 11a of the other NIC 11 as indicated by an X mark on an arrow Y1. Therefore, a NW bandwidth in which the target function 16 can be accessed is limited to 40 Gbps.

A countermeasure against this includes a configuration in which a target function is divided and a target function 16b connected to an NIC 11 is included separately from a target function 16a of a utilization type NIC 15, as in a server 10C illustrated in FIG. 21. In this configuration, because two NIC ports 11a and 15a having 40 Gbps are used, an NW bandwidth can be a wide bandwidth of 80 Gbps. However, in this configuration, because the target functions 16a and 16b are divided, packets are input from a plurality of directions, as indicated by arrows Y2 and Y3, when viewed from APLs 12a to 12c. Thus, processing of the APLs 12a to 12c becomes complicated and is limited, which causes a problem that an effect of widening the NW bandwidth becomes weak.

The present invention has been made in view of the above circumstances, and an object of the present invention is to provide a server, a server system, and a method of increasing a network bandwidth of the server, which are capable of increasing an available network bandwidth without limiting processing of applications.

Means for Solving the Problem

As a means for solving the above problems, a first aspect of the present invention provides a server including a smart NIC including an accelerator configured on a network interface card (NIC) having an expansion function for connection to a communication network, a CPU that performs processing according to an application, and a target function having at least a data transfer function mounted in the smart NIC, the server distributing and transferring data in a packet input from the communication network to the smart NIC to a target application after processing the data using the target function, and transmitting a packet relevant to processing of the application from the smart NIC to the communication network via the target function, the server including an NIC having the expansion function, and a virtual patch panel having a transfer function of mediating packet transfer between the NIC and the smart NIC, the transfer function being implemented by software, wherein w % ben a packet input from the communication network to the NIC is transferred between the NIC and the smart NIC via the virtual patch panel, the target function of the smart NIC transfers the packet to and from the application.

A seventh aspect of the present invention provides a method of increasing a network bandwidth of a server including a smart NIC including an accelerator configured on an NIC having an expansion function for connection to a communication network, a CPU that performs processing according to an application, and a target function having at least a data transfer function mounted in the smart NIC, the server distributing and transferring data in a packet input from the communication network to the smart NIC to a target application after processing the data using the target function, and transmitting the packet relevant to processing of the application from the smart NIC to the communication network via the target function, wherein the server includes an NIC having the expansion function, and a virtual patch panel having a transfer function of mediating packet transfer between the NIC and the smart NIC, the transfer function being implemented by software, and the method executes transferring, by the target function of the smart NIC, a packet input from the communication network to the NIC to and from the application when the packet is transferred between the NIC and the smart NIC via the virtual patch panel.

With the configuration of the first aspect and the method of the seventh aspect, because the packet can be transferred between the NIC and the smart NIC via the virtual patch panel, the server can use a bandwidth that is a sum of a network bandwidth when the NIC communicates with the communication network and a network bandwidth when the smart NIC communicates with the network. This allows the network bandwidth available to the server to be increased. Further, because a packet is necessarily transferred to the application via only the smart NIC in packet transfer between the NIC or the smart NIC and the application, the processing of the application is not limited. That is, with the server of the present invention, it is possible to increase an available network bandwidth without limiting processing of applications.

A second aspect of the present invention provides the server according to the first aspect, wherein the virtual patch panel includes a first input/output terminal and a second input/output terminal for packets, the server includes a second target function obtained by implementing the same function as the target function mounted in the smart NIC by software, the application is connected to the first input/output terminal of the virtual patch panel, and the second target function and the target function connected to the NIC are connected to the second input/output terminal, and, when a packet is transferred between both of the second target function via the NIC and the target function on the smart NIC, and the application, the packet is transferred between the application and the first input/output terminal of the virtual patch panel and the packet is transferred between both of the second target function and the target function and the second input/output terminal.

An eighth aspect of the present invention provides the method of increasing a network bandwidth of a server according to the seventh aspect, wherein the virtual patch panel includes a first input/output terminal and a second input/output terminal for packets, the server includes a second target function obtained by implementing the same function as the target function mounted in the smart NIC by software, the application is connected to the first input/output terminal of the virtual patch panel, and the second target function and the target function connected to the NIC are connected to the second input/output terminal, and when a packet is transferred between both of the second target function via the NIC and the target function on the smart NIC, and the application, the packet is transferred between the application and the first input/output terminal of the virtual patch panel and the packet is transferred between both of the second target function and the target function and the second input/output terminal.

With the configuration of the second aspect and the method of the eighth aspect, because packets can be transferred between both of the NIC and the smart NIC, and the application via the virtual patch panel, the server can use a bandwidth that is a sum of a network bandwidth when the NIC communicates with the communication network and a network bandwidth when the smart NIC communicates with the network. This can increase the network bandwidth available to the server. Further, two packets input from both of the NIC and the smart NIC can be transferred from the first input/output terminal of the virtual patch panel to the application. Therefore, because packets are transferred in only one direction when viewed from the application side, complicated processing as when packets are input to the application in a plurality of directions is eliminated. In other words, the application processing is not limited. That is, with the server of the present invention, it is possible to increase an available network bandwidth without limiting processing of applications.

A third aspect of the present invention provides a server including a smart NIC including an accelerator configured on an NIC having an expansion function for connection to a communication network, a CPU that performs processing according to an application, and at least a data transfer function mounted in the smart NIC, the server distributing and transferring data in a packet input from the communication network to the smart NIC to a target application after processing the data using the data transfer function, and transmitting the packet relevant to processing of the application from the smart NIC to the communication network via the data transfer function, the server including an NIC having the expansion function, and a virtual patch panel having a transfer function of mediating packet transfer between the NIC and the smart NIC, the transfer function being implemented by software, wherein a forwarder that performs processing of transferring a packet from one input source to one output destination is created by software and mounted in the virtual patch panel, a classifier serving as the transfer function of performing processing of distributing and transferring a packet from one input source to a plurality of output destinations, and a merger serving as the transfer function of merging packets from a plurality of input sources and transferring a merged packet to one output destination are created by hardware and mounted in the smart NIC, and, after the packet input to the NIC is transferred from the forwarder to the classifier, the packet input to the NIC is distributed by the classifier and transferred to the application, and the packet input to the smart NIC is distributed by the classifier and transferred to the application, and, after a packet from the application is transferred to the merger of the smart NIC, the packet from the application is transferred from the merger to the NIC via the forwarder.

With this configuration, because packet transfer between the NIC or the smart NIC and the application can be performed via the forwarder of the virtual patch panel and the classifier and the merger of the smart NIC, the server can use a bandwidth that is a sum of a network bandwidth of the NIC and a network bandwidth of the smart NIC. This can increase the network bandwidth available to the server. Further, because a packet is necessarily transferred to the application via only the classifier or only the merger of the smart NIC in packet transfer between the NIC or the smart NIC and the application, the processing of the application is not limited. That is, with the server of the present invention, it is possible to increase an available network bandwidth without limiting processing of applications.

A fourth aspect of the present invention provides a server including a smart NIC including an accelerator configured on an NIC having an expansion function for connection to a communication network, a CPU that performs processing according to an application, and at least a data transfer function mounted in the smart NIC, the server distributing and transferring data in a packet input from the communication network to the smart NIC to a target application after processing the data using the data transfer function, and transmitting the packet relevant to processing of the application from the smart NIC to the communication network via the data transfer function, the server including an NIC having the expansion function, and a virtual patch panel having a transfer function of mediating packet transfer between the NIC and the smart NIC, the transfer function being implemented by software, wherein a plurality of classifiers serving as the transfer function of performing processing of distributing and transferring a packet from one input source to a plurality of output destinations, and a plurality of mergers serving as the transfer function of merging packets from a plurality of input sources and transferring a merged packet to one output destination are created by software and mounted in the virtual patch panel, a classifier serving as the data transfer function of performing processing of distributing and transferring the packet from the one input source to the plurality of output destinations, and a merger serving as the data transfer function of merging packets from the plurality of input sources and transferring a merged packet to one output destination are created by hardware and mounted in the smart NIC, the packet input to the NIC is distributed by one of the plurality of classifiers of the virtual patch panel and output to the plurality of mergers of the virtual patch panel, the packet input to the smart NIC is distributed by the classifier of the smart NIC and output to the plurality of mergers, and each of the mergers merges the packet from the NIC and the packet from the smart NIC and transfers the merged packet to the application, and a packet from each application is distributed by each of the plurality of classifiers of the virtual patch panel, one of the distributed packets is transferred to the NIC via the merger of the virtual patch panel, and the other packet is transferred to the merger of the smart NIC.

With this configuration, because packet transfer between the NIC or the smart NIC and the application can be performed via the classifier and the merger of the virtual patch panel and the classifier and the merger of the smart NIC, the server can use a bandwidth that is a sum of a network bandwidth of the NIC and a network bandwidth of the smart NIC. This can increase the network bandwidth available to the server. Further, because packet transfer between the NIC or smart NIC and the application is necessarily performed by the merger and the application of the virtual patch panel on a one-to-one basis or performed by the application and the classifier of the virtual patch panel on a one-to-one basis. Therefore, because packets are transferred in only one direction when viewed from the application side, complicated processing as when packets are input to the application in a plurality of directions is eliminated. In other words, the application processing is not limited. That is, with the server of the present invention, it is possible to increase an available network bandwidth without limiting processing of applications.

A fifth aspect of the present invention provides a server system including a server including a smart NIC including an accelerator configured on an NIC having an expansion function for connection to a communication network, a CPU that performs processing according to an application, and at least a data transfer function mounted in the smart NIC, the server distributing and transferring data in a packet input from the communication network to the smart NIC to a target application after processing the data using the data transfer function, and transmitting the packet relevant to processing of the application from the smart NIC to the communication network via the data transfer function, and a control unit configured to control the server, wherein the server includes an NIC having the expansion function, and a virtual patch panel having a transfer function of mediating packet transfer between the NIC and the smart NIC, the transfer function being implemented by software, a plurality of forwarders serving as the transfer function of transferring the packet from one input source to one output destination, a plurality of classifiers serving as the transfer function of performing processing of distributing and transferring a packet from one input source to a plurality of output destinations, and a plurality of mergers serving as the transfer function of merging packets from a plurality of input sources and transferring a merged packet to one output destination are created by software and mounted in the virtual patch panel, a classifier serving as the data transfer function of performing processing of distributing and transferring the packet from one input source to a plurality of output destinations, and a merger serving as the data transfer function of merging packets from a plurality of input sources and transferring a merged packet to one output destination are created by hardware and mounted in the smart NIC, and the control unit performs a request for addition of an NIC as an addition target when both or any one of a performance including a packet transfer capacity of a first transfer function including the plurality of forwarders mounted by software in the virtual patch panel of the server and the classifier and the merger mounted by hardware, and a performance including a packet transfer capacity of a second transfer function including the classifier and the merger mounted by hardware and software in the smart NIC is equal to or smaller than a predetermined threshold value of a performance, and a network bandwidth of the NIC as an addition target is suitable for a network bandwidth required for both or any one of a configuration of the first transfer function and a configuration of the second transfer function.

With this configuration, for example, when a network bandwidth is further required for the server, the control unit can determine whether or not the NIC as an addition target can be added and make a request for addition of the NIC.

A sixth aspect of the present invention provides the server system according to the fifth aspect, wherein the control unit performs control for configuring, in the server, the first transfer function or the second transfer function in which suitability of the network bandwidth becomes high due to an NIC to be added when the NIC is added to the configuration of the first transfer function or the second transfer function of the server in response to the request for addition of the NIC.

With this configuration, it is possible to add the NIC to the server such that the network bandwidth is optimized, and to achieve high performance of the server and saving of resources.

Effects of the Invention

According to the present invention, it is possible to provide a server, a server system, and a method of increasing a network bandwidth of the server, which can increase the available network bandwidth without limiting the processing of applications.

BRIEF DESCRIPTION OF DRAWINGS

FIG. 11 is a diagram illustrating written content of a policy table.

FIG. 12 is a diagram illustrating written content of a threshold value table.

DESCRIPTION OF EMBODIMENTS

Hereinafter, embodiments of the present invention will be described with reference to the drawings. Here, in all the drawings of the present specification, components having corresponding functions are denoted by the same reference signs, and description thereof will be appropriately omitted.

Configuration of First Embodiment

Figure 1:
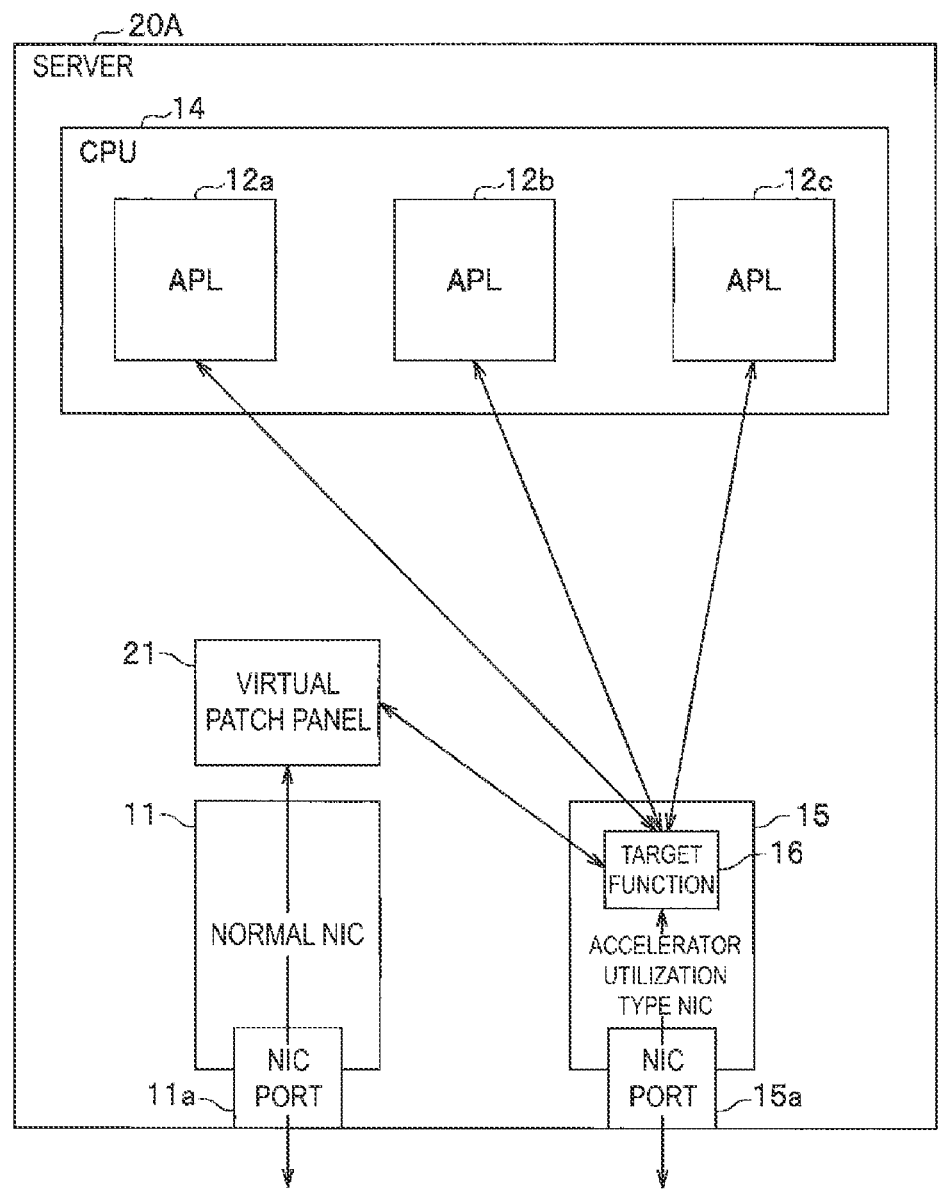
FIG. 1 is a block diagram illustrating a configuration of a server according to a first embodiment of the present invention.
Figure 20:
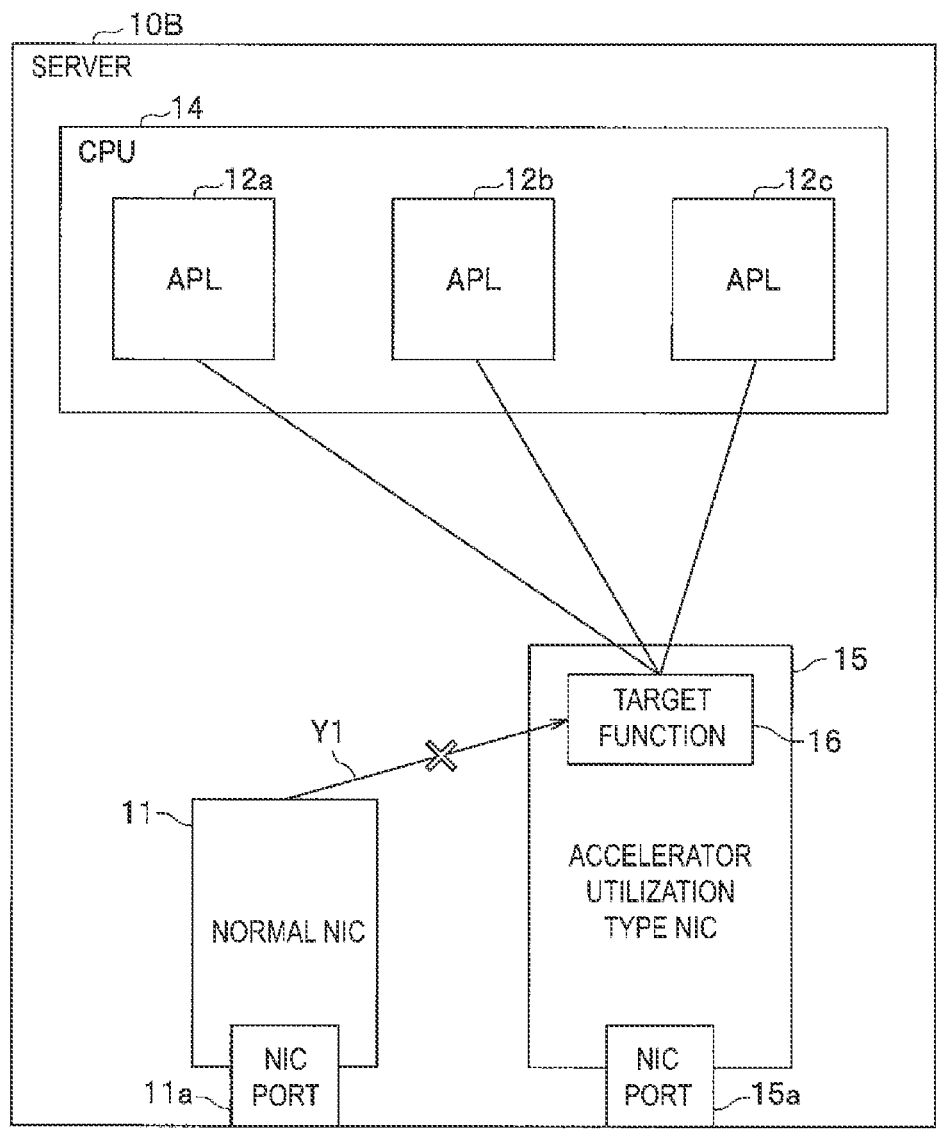
FIG. 20 is a block diagram illustrating a configuration of a server including a normal NIC and an accelerator utilization type NIC in the related art.
Figure 21:
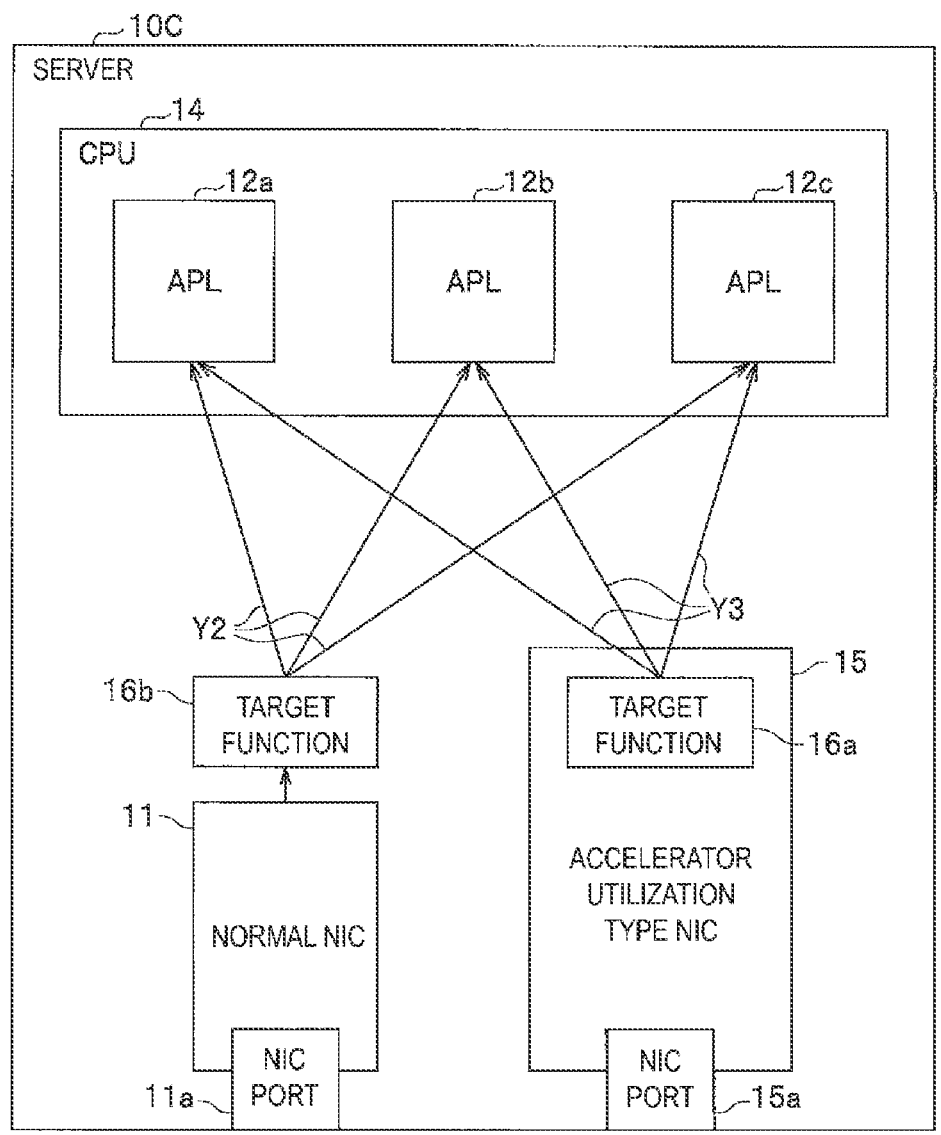
FIG. 21 is a block diagram illustrating a configuration of a server including a normal NIC and an accelerator utilization type NIC to which a target function is connected in the related art.

FIG. 1 is a block diagram illustrating a configuration of a server according to a first embodiment of the present invention. A server 20A illustrated in FIG. 1 differs from the server 10B (FIG. 20) of the related art in that a virtual patch panel 21 is connected and provided between a normal NIC 11 and a target function 16 of an accelerator utilization type NIC (utilization type NIC) 15. The normal NIC 11 is the above-described NIC 11 (see FIGS. 18 to 21), and is a name given for easy distinction from the utilization type NIC 15.

The virtual patch panel 21 is obtained by implementing a packet transfer function in the server 20A by software, and has a function of transferring a packet between the normal NIC 11 and the target function 16 of the utilization type NIC 15.

The virtual patch panel 21 is obtained by implementing a virtual patch panel technology for transferring a packet input from the normal NIC 11 to the utilization type NIC 15 by software. In the virtual patch panel technology, it is possible to change a packet transfer destination (a connection destination), and a plurality of normal NICs 11 can be connected to the utilization type NIC 15. The packet transferred by the virtual patch panel 21 is processed by the accelerator of the utilization type NIC 15. This accelerator is responsible for a part of processing of the CPU 14 and performs the processing, and the target function 16 that is a data transfer function can execute the transfer process.

In the server 20A having such a configuration, a packet input from a communication device (not illustrated) outside the server 20A to the normal NIC 11 via the NIC port 11a is transferred to the utilization type NIC 15 by the virtual patch panel 21 and is further transferred to the APLs 12a to 12c by the target function 16. On the other hand, the packet for which processing of the APLs 12a to 12c has been completed is transferred to the virtual patch panel 21 after being transferred to the target function 16, further transferred from the virtual patch panel 21 to the normal NIC 11, and transmitted from the NIC port 11a to the communication device.

Further, a packet input from the communication device to the utilization type NIC 15 via the NIC port 15a is transferred from the target function 16 to the APLs 12a to 12c. On the other hand, a packet for which the processing of the APLs 12a to 12c has been completed is transferred to the target function 16 and then transmitted from the NIC port 15a to the communication device. Thus, the server 20A can use the two NIC ports 11a and 15a when performing communication with the external communication device via a network.

Effects of First Embodiment Effects of the server 20A according to the first embodiment will be described. The server 20A includes the accelerator utilization type NIC 15 serving as a smart NIC in which an accelerator is configured on an NIC having an expansion function for connection to a communication network. Further, the server 20A includes the CPU 14 that performs processing according to the APLs 12a to 12c, and the target function 16 having at least a data transfer function mounted in the accelerator utilization type NIC 15. Further, the server 20A distributes and transfers, to the target APLs 12a to 12c, data in the packet input to the utilization type NIC 15 from the communication network, after the data is processed by the target function 16. Further, the server 20A transmits the packet relevant to the processing of the APLs 12a to 12c from the utilization type NIC 15 to the communication network via the target function 16. This server 20A has the following characteristic configuration.

The server 20A includes the normal NIC 11 as an NIC having an expansion function, and the virtual patch panel 21 obtained by implementing a transfer function of mediating packet transfer between the normal NIC 11 and the utilization type NIC 15 by software. The server 20A is configured such that the target function 16 transfers the packet to the APLs 12a to 12c when the packet is transferred between the normal NIC 11 and the utilization type NIC 15 via the virtual patch panel 21.

With this configuration, packets can be transferred between the normal NIC 11 and the utilization type NIC 15 via the virtual patch panel 21. This allows the server 20A to use a bandwidth that is a sum of a network bandwidth of the NIC port 11a when the normal NIC 11 communicates with the communication network and a network bandwidth of the NIC port 15a when the utilization type NIC 15 communicates with the communication network. When the network bandwidth of the port 11a of the normal NIC 11 is 40 Gbps and a network bandwidth of the port 15a of the utilization type NIC 15 is 40 Gbps, a bandwidth of 80 Gbps can be used. This allows the network bandwidth available to the server 20A to be increased.

Further, because in the packet transfer between the normal NIC 11 or the utilization type NIC 15 and the APLs 12a to 12c, the packet is necessarily transferred to the APLs 12a to 12c via only the utilization type NIC 15, the processing of the APLs 12a to 12c is not limited. That is, with the server 20A of the embodiment, it is possible to increase the available network bandwidth without limiting the processing of the APLs 12a to 12c.

Further, because the server 20A can be configured using the normal NIC 11 and the utilization type NIC 15 which are general-purpose products, it is possible to reduce a manufacturing cost.

Configuration of Second Embodiment

Figure 2:
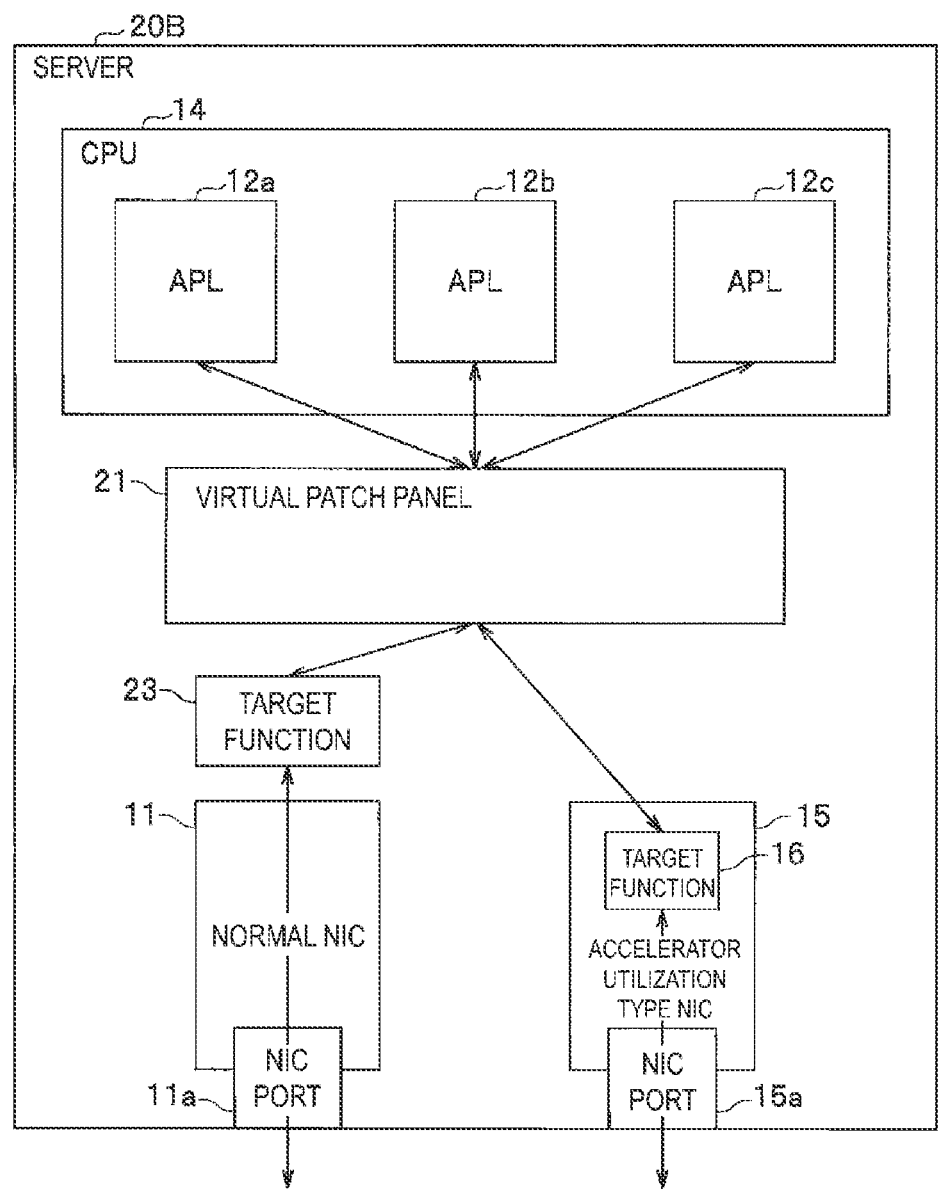
FIG. 2 is a block diagram illustrating a configuration of a server according to a second embodiment of the present invention.

FIG. 2 is a block diagram illustrating a configuration of a server according to a second embodiment of the present invention.

A server 20B illustrated in FIG. 2 differs from the server 20A (FIG. 1) of the first embodiment in that a target function 23 is additionally included, and one of packet input/output terminals (a first input/output terminal) of a virtual patch panel 21 is connected to APLs 12a to 12c. Further, the server 20B illustrated in FIG. 2 differs from the server 20A (FIG. 1) of the first embodiment in that the other input/output terminal (a second input/output terminal) of the virtual patch panel 21 is connected to the target function (second target function) 23 connected to the normal NIC 11, and a target function 16 in the utilization type NIC 15.

The added target function 23 is obtained by implementing, in the server 20B, the target function 16 of hardware operating on the utilization type NIC 15 by software.

In the server 20B having such a configuration, a packet input from the communication device to the normal NIC 11 via an NIC port 11a is input to the virtual patch panel 21 via the target function 23. Further, a packet input from the communication device to the utilization type NIC 15 via an NIC port 15a is input to the virtual patch panel 21 via the target function 16. Both a packet input from the normal NIC 11 and a packet input from the utilization type NIC 15 can be transferred from one input/output terminal of the virtual patch panel 21 to the APLs 12a to 12c. Thus, packets are transferred in only one direction when viewed from the APL 12a to 12c side.

On the other hand, the packet for which the processing of the APLs 12a to 12c has been completed is transmitted from the NIC port 15a of the virtual patch panel 21 to the communication device after being transferred to the target function 16, and is transmitted from the NIC port 11a of the normal NIC 11 to a communication equipment via the target function 23. Thus, the server 20B can use the two NIC ports 11a and 15a when communicating with an external communication device via the network.

Effects of Second Embodiment

Effects of the server 20B according to the second embodiment will be described. The server 20B includes the accelerator utilization type NIC 15 serving as a smart NIC in which an accelerator is configured on an NIC having an expansion function for connection to a communication network. Further, the server 20B includes a CPU 14 that performs processing according to the APLs 12a to 12c, and the target function 16 having at least a data transfer function mounted in the accelerator utilization type NIC 15. Further, the server 20B distributes and transfers, to the target APLs 12a to 12c, data in the packet input to the utilization type NIC 15 from the communication network, after the data is processed by the target function 16. Further, the server 20B transmits the packet relevant to the processing of the APLs 12a to 12c from the utilization type NIC 15 to the communication network via the target function 16. This server 20B has the following characteristic configuration.

The server 20B includes the normal NIC 11 serving as an NIC having an expansion function, the virtual patch panel 21 obtained by implementing, by software, a transfer function of mediating the packet transfer between the normal NIC 11 and the utilization type NIC 15 serving as a smart NIC, and a target function (a second target function) 23 obtained by implementing the same function as the target function 16 mounted in the utilization type NIC 15 by software.

In this server 20B, the target function 23 is connected to the normal NIC 11, the APLs 12a to 12c are connected to the first input/output terminal for packets of the virtual patch panel 21, and the target function 23 connected to the normal NIC 11 and the target function 16 are connected to the second input/output terminal for packets. The following configuration is adopted when packets are transferred between both of the target function 23 via the normal NIC 11 and the target function 16 on the utilization type NIC 15, and the APLs 12a to 12c. That is, the configuration is such that a packet is transferred between the APLs 12a to 12c and the first input/output terminal of the virtual patch panel 21, and a packet is transferred between both of the target function 23 and the target function 16 and the second input/output terminal.

With this configuration, packets can be transferred between both of the normal NIC 11 and the utilization type NIC 15, and the APLs 12a to 12c via the virtual patch panel 21. Thus, the server 20B can use a bandwidth that is a sum of a network bandwidth when the normal NIC 11 communicates with the communication network and a network bandwidth when the utilization type NIC 15 communicates with the communication network. This allows a network bandwidth available to the server 20B to be increased.

Further, both a packet input from the normal NIC 11 and a packet input from the utilization type NIC 15 can be transferred from the first input/output terminal of the virtual patch panel 21 to the APLs 12a to 12c. Therefore, because packets are transferred in only one direction when viewed from the APLs 12a to 12c side, complicated processing as when packets are input to the APLs 12a to 12c in a plurality of directions is eliminated. In other words, the processing of the APLs 12a to 12c is not limited. That is, with the server 20B of the embodiment, it is possible to increase the available network bandwidth without limiting the processing of the APLs 12a to 12c.

Further, because the server 20B can be configured using the normal NIC 11 and the utilization type NIC 15 which are general-purpose products, it is possible to reduce a manufacturing cost.

Configuration of Third Embodiment

Figure 3:
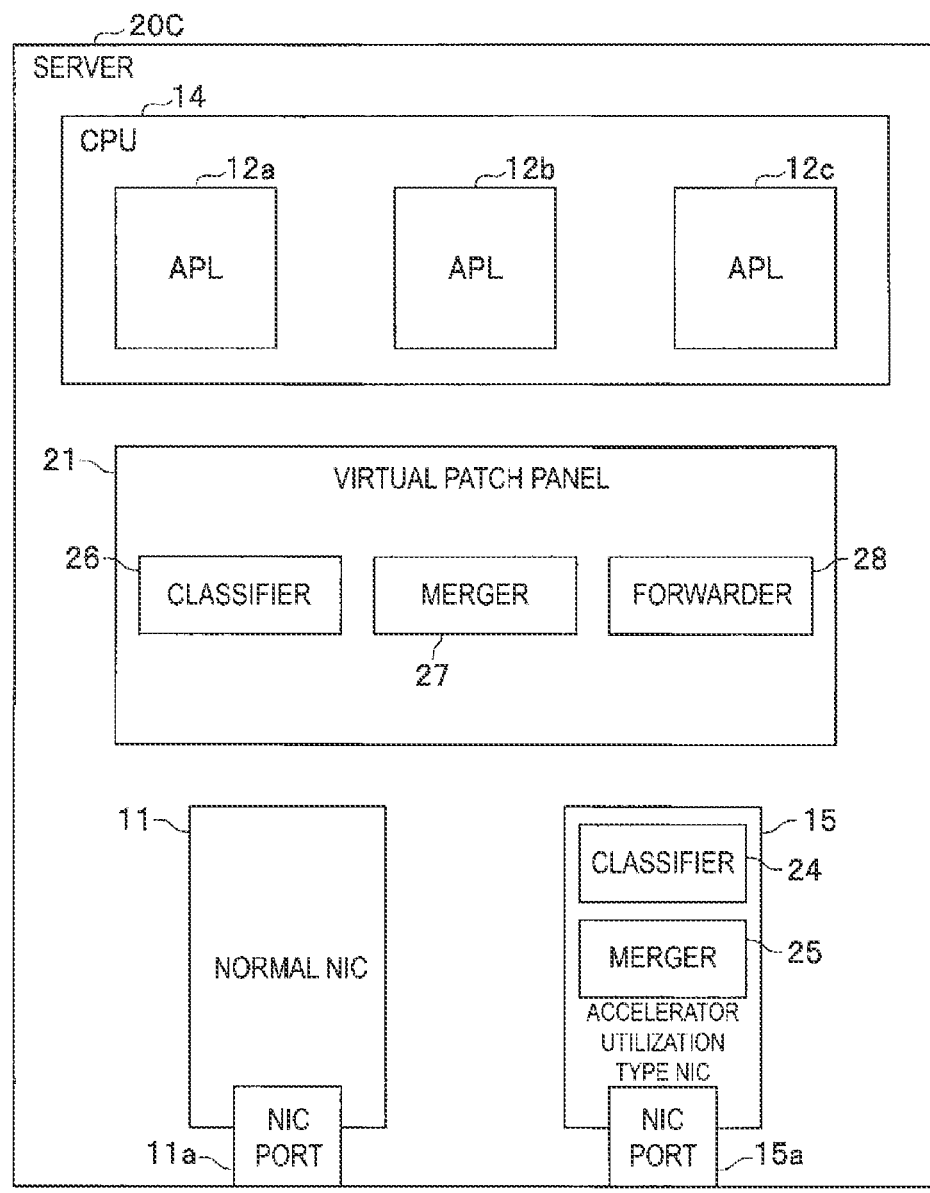
FIG. 3 is a block diagram illustrating a configuration of a server according to a third embodiment of the present invention.

FIG. 3 is a block diagram illustrating a configuration of a server according to a third embodiment of the present invention.

A server 20C illustrated in FIG. 3 includes a normal NIC 11 having the same NIC port 11a as the server 20B (FIG. 2) of the second embodiment, a CPU 14 having APLs 12a to 12c, a utilization type NIC 15 having an NIC port 15a, and a virtual patch panel 21. Further, the server 20C illustrated in FIG. 3 includes a classifier 24 and a merger 25 in the utilization type NIC 15, and a classifier 26, a merger 27, and a forwarder 28 in the virtual patch panel 21.

The virtual patch panel 21 is obtained by implementing a virtual patch panel technology for transferring packets as described above by software. Meanwhile, functions such as the classifier 26, the merger 27, and the forwarder 28 operate as software on the cores of the CPU 14 (CPU cores), and a plurality of CPU cores are operated in parallel, thereby ensuring high-speed performance, as illustrated in FIG. 4.

Figure 4:
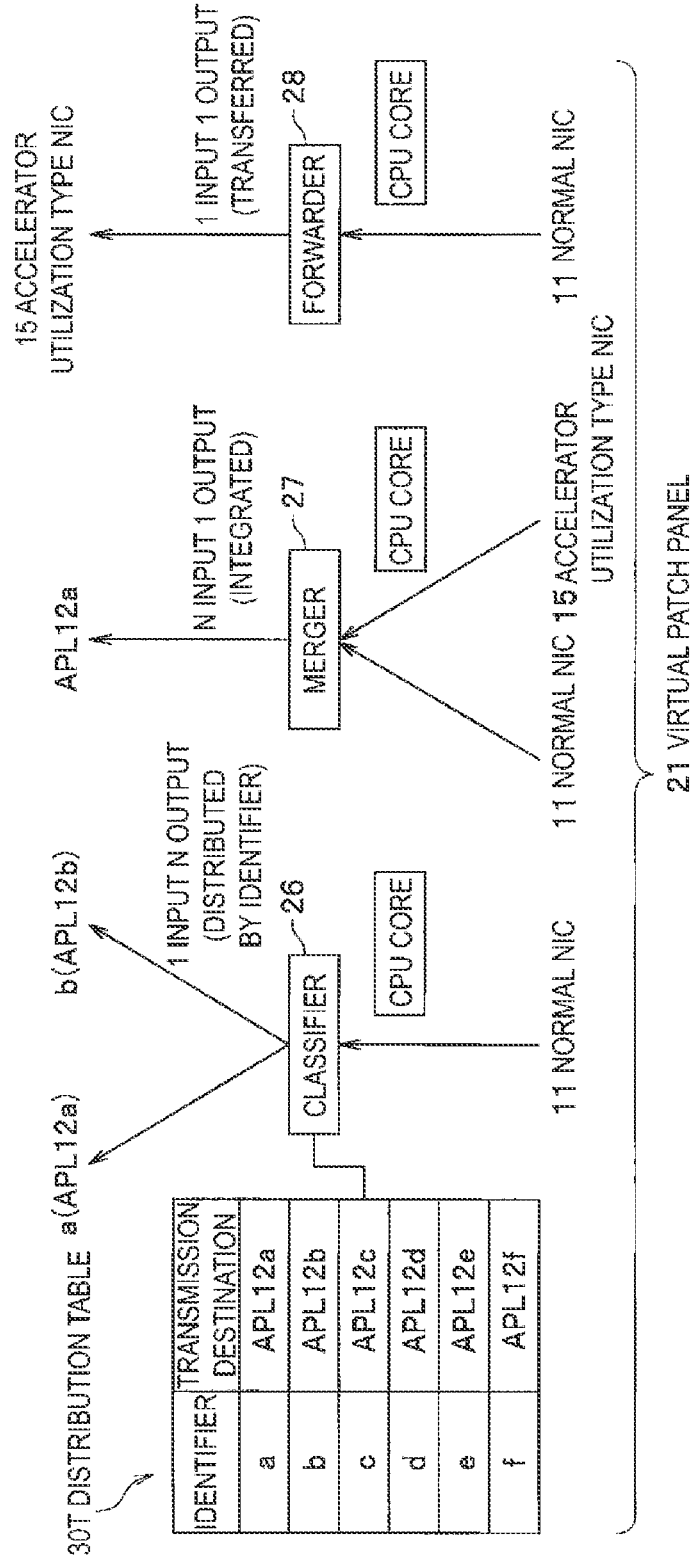
FIG. 4 is a block diagram illustrating a distribution table of a virtual patch panel and a configuration including a classifier, a merger, and a forwarder.

The virtual patch panel 21 has a distribution table 30T illustrated in FIG. 4. The distribution table 30T includes an identifier (for example, a to f) such as a destination IP address, and a transmission destination (for example, APLs 12a to 12f) associated with the identifiers a to f.

The classifier 26 performs a process of distributing packets from one input source to a plurality (N) of output destinations and transferring the packets. For example, when packets are input from the normal NIC 11, the classifier 26 refers to the distribution table 30T and distributes and transfers the packets to the transmission destinations APL12a and APL12b associated with the identifiers a and b such as the destination IP address.

The merger 27 performs a process of merging packets from a plurality (N) of input sources and transfers a resultant packet to one output destination. For example, when a packet from the normal NIC 11 and a packet from the utilization type NIC 15 are input, the merger 27 merges both of the packets and transfers a resultant packet to the one APL 12a.

The forwarder 28 performs a process of transferring a packet from one input source to one output destination. For example, the forwarder 28 transfers the packet from the normal NIC 11 to the utilization type NIC 15.

The classifier 24 and the merger 25 in the accelerator utilization type NIC 15 illustrated in FIG. 3 are configured by hardware on the accelerator, and perform the same processing as the classifier 26 and the merger 27 as software described above. Here, the distribution table 30T referenced by the classifier 24 is included in the utilization type NIC 15.

The server 20C having such a configuration has a first transfer function and a second transfer function, which are two types of packet transfer functions to be described below.

Figure 5:
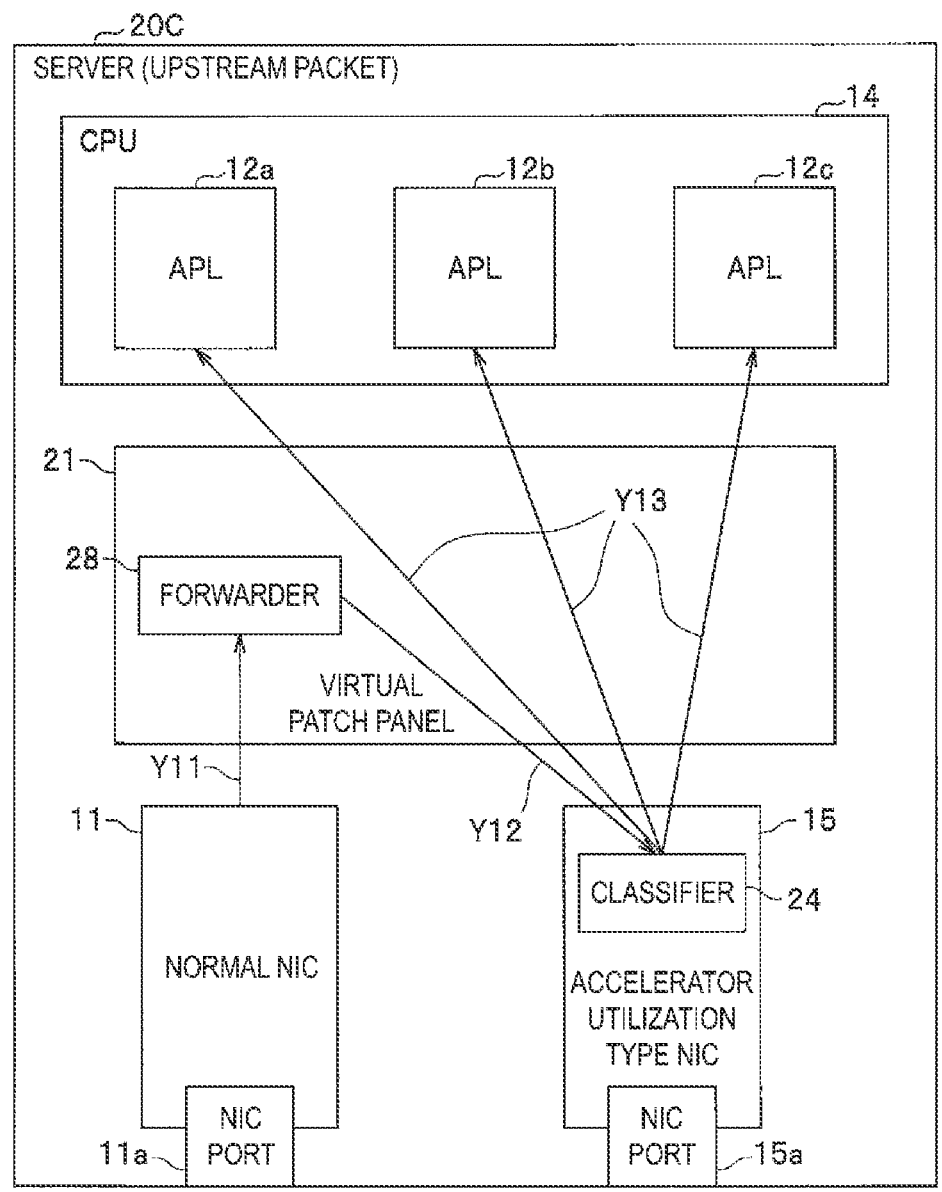
FIG. 5 is a block diagram illustrating a configuration of a first transfer function of a server on the upstream packet side.

The first transfer function performs the following packet transfer. That is, as illustrated in FIG. 5, an upstream packet input from the external communication device to the normal NIC 11 via the NIC port 11a is input to the forwarder 28 of the virtual patch panel 21 as indicated by an arrow Y11, and the forwarder 28 transfers the packet to the classifier 24 of the utilization type NIC 15 as indicated by an arrow Y12. The classifier 24 then distributes and transfer the packet to the APLs 12a to 12c, as indicated by an arrow Y13. Further, the classifier 24 of the utilization type NIC 15 distributes and transfers an upstream packet input to the classifier 24 of the utilization type NIC 15, to the APLs 12a to 12c as indicated by the arrow Y13.

Figure 6:
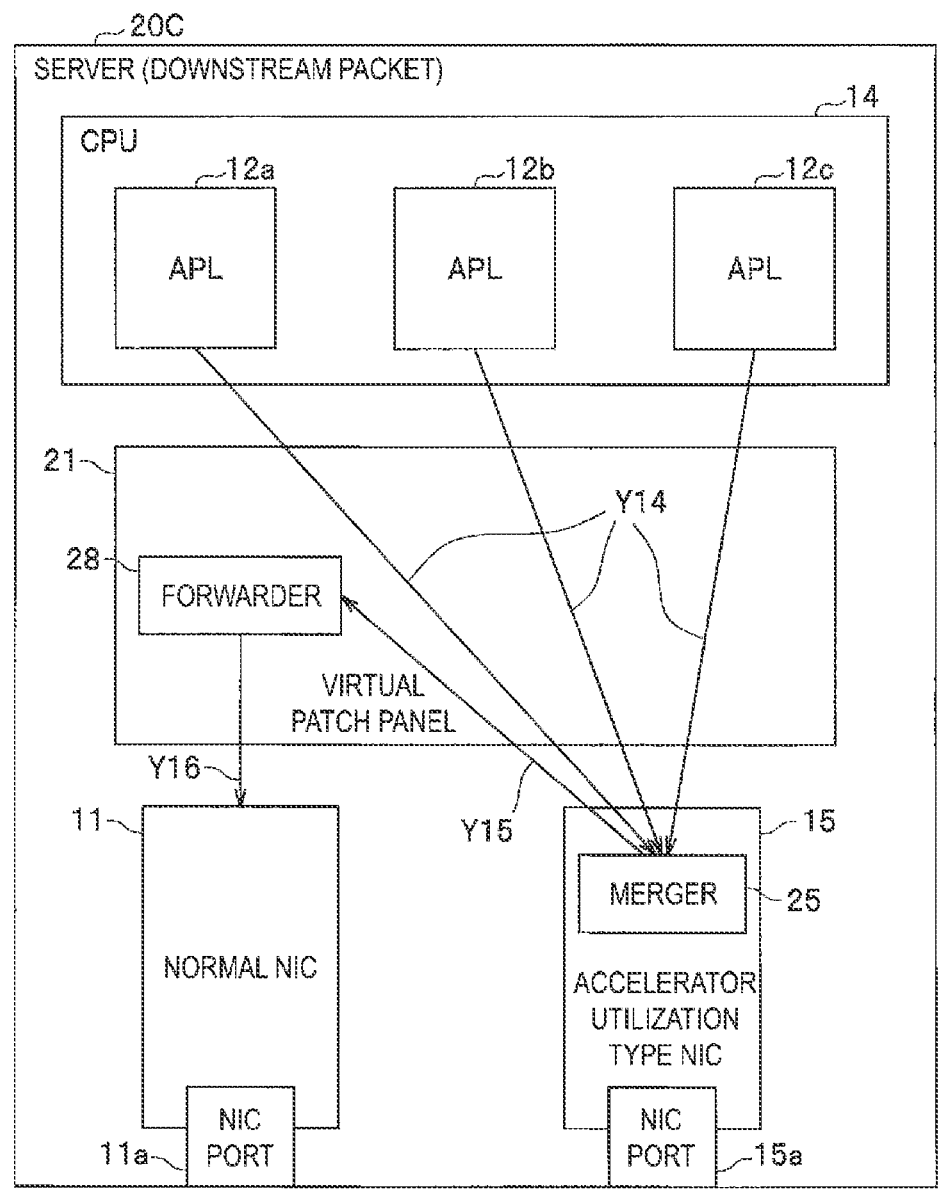
FIG. 6 is a block diagram illustrating a configuration of a first transfer function of a server on the downstream packet side.

On the other hand, as illustrated in FIG. 6, a downstream packets for which the processing of the APLs 12a to 12c has been completed are transferred to the merger 25 of the utilization type NIC 15 as indicated by an arrow Y14, and the merger 25 merges the packets and transfers a resultant packet to the forwarder 28 of the virtual patch panel 21 as indicated by an arrow Y15. The forwarder 28 then transfers the packet to the normal NIC 11 as indicated by an arrow Y16, and the transferred packet is transmitted from the NIC port 11a to the communication device. Further, a downstream packet transferred to the merger 25 for which the processing of the APLs 12a to 12c has been completed is transmitted from the NIC port 15a of the utilization type NIC 15 to the communication device.

Figure 7:
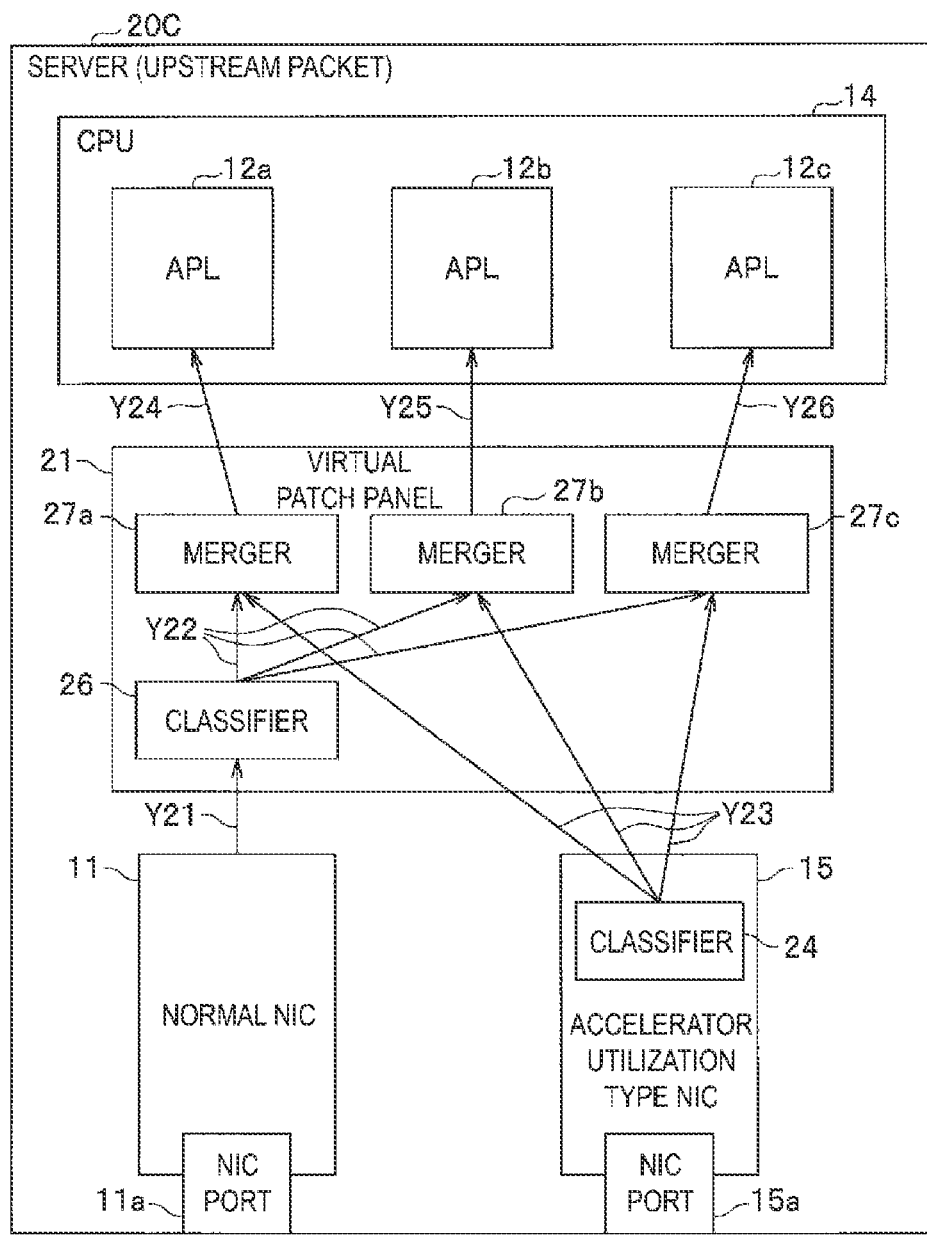
FIG. 7 is a block diagram illustrating a configuration of a second transfer function of a server on the upstream packet side.

The second transfer function performs the following packet transfer. That is, as illustrated in FIG. 7, an upstream packet input from the external communication device to the normal NIC 11 via the NIC port 11a is input to the classifier 26 of the virtual patch panel 21 as indicated by an arrow Y21. The classifier 26 outputs the packet to the respective mergers 27a, 27b, and 27c, as indicated by an arrow Y22. Meanwhile, an upstream packet input from the external communication device to the utilization type NIC 15 via the NIC port 15a is transferred to the respective mergers 27a to 27c by the classifier 24 as indicated by an arrow Y23.

The merger 27a merges the two packets transferred from the normal NIC 11 and the utilization type NIC 15 and transfers a resultant packet to the one APL 12a as indicated by an arrow Y24. Similarly, the merger 27b merges the two packets transferred in the same manner and transfers a resultant packet to the one APL 12b as indicated by the arrow Y25, and the merger 27c similarly merges the two packets and transfers a resultant packet to the one APL 12c as indicated by arrow Y26.

Figure 8:
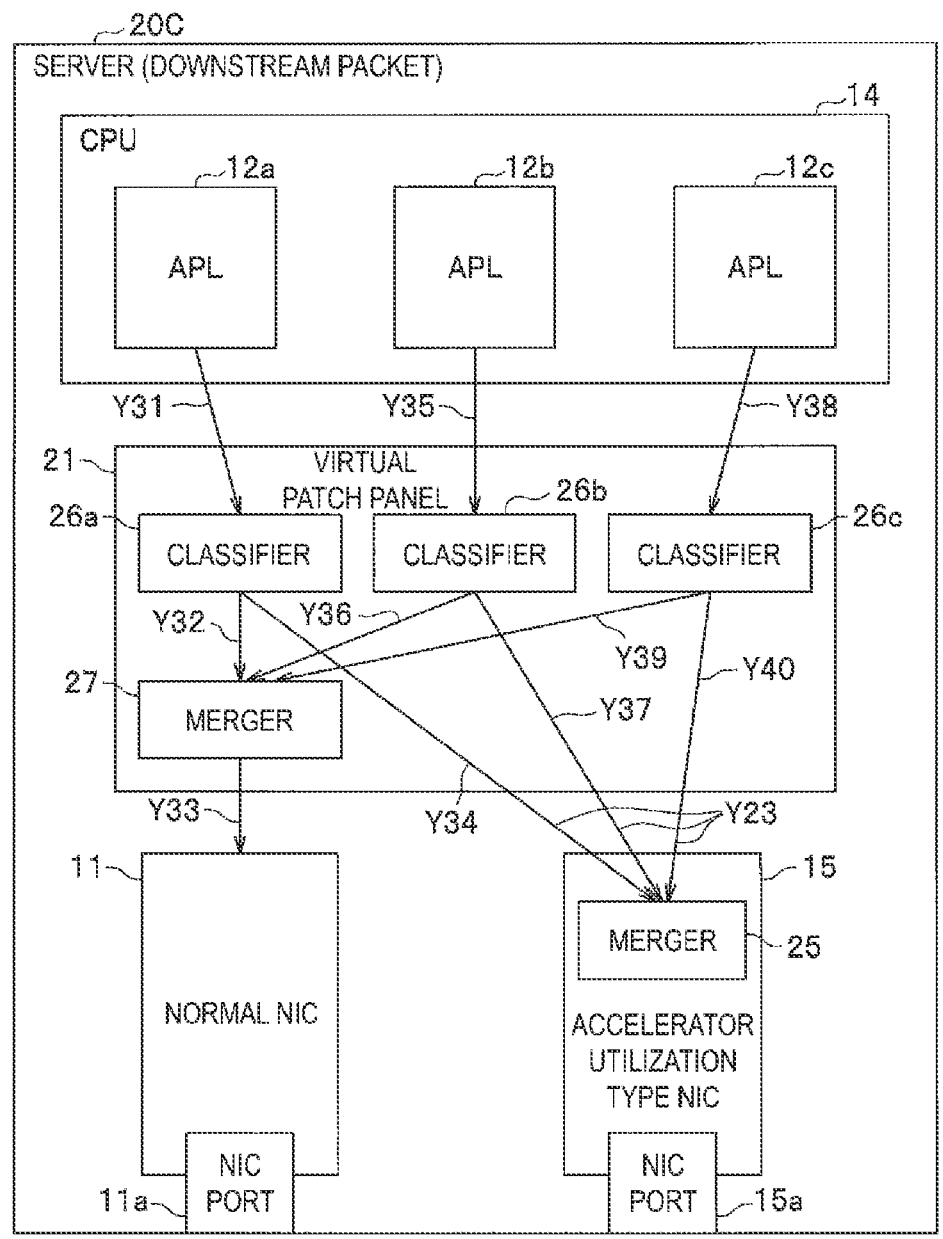
FIG. 8 is a block diagram illustrating a configuration of a second transfer function of a server on the downstream packet side.

Meanwhile, a downstream packet for which the processing of the APL 12a has been completed is transferred to a classifier 26a of the virtual patch panel 21 as indicated by an arrow Y31, as illustrated in FIG. 8. The classifier 26a separates the packets, transfers the packets to the normal NIC 11 via the merger 27 as indicated by arrows Y32 and Y33, and transfers the packets to the merger 25 of the utilization type NIC 15 as indicated by arrow Y34.

Similarly, a downstream packet for which the processing of the APL 12b has been completed is transferred to a classifier 26b, as indicated by an arrow Y35. Then, the classifier 26b separates the packets, transfers the packets to the normal NIC 11 via the merger 27 as indicated by arrows Y36 and Y33, and transfers the packets to the merger 25 of the utilization type NIC 15 as indicated by arrow Y37. A downlink packet for which the processing of the APL 12c has been completed is transferred to the classifier 26c, as indicated by an arrow Y38. Then, the classifier 26c separates the packets, transfers the packets to the normal NIC 11 via the merger 27 as indicated by arrows Y39 and Y33, and transfers the packets to the merger 25 of the utilization type NIC 15 as indicated by arrow Y40.

Effects of Third Embodiment

Effects of the server 20C according to the third embodiment will be described. The server 20C includes the accelerator utilization type NIC 15 serving as a smart NIC in which an accelerator is configured on an NIC having an expansion function for connection to a communication network. Further, the server 20C includes a CPU 14 that performs processing according to the APLs 12a to 12c, and at least a data transfer function mounted in the accelerator utilization type NIC 15. Further, the server 20C distributes and transfers, to the target APLs 12a to 12c, data in the packet input to the utilization type NIC 15, after the data is processed using the transfer function. Further, the server 20C transmits the packet relevant to the processing of the APLs 12a to 12c from the utilization type NIC 15 to the communication network via the transfer function. This server 20C has the following characteristic configuration.

(1) The first transfer function of the server 20C is configured as follows. The server 20C includes the normal NIC 11 that is an NIC having an expansion function, and the virtual patch panel 21 obtained by implementing a transfer function of mediating packet transfer between the normal NIC 11 and the utilization type NIC 15 by software. The forwarder 28 that performs a process of transferring a packet from one input source to one output destination is created by software and mounted in the virtual patch panel 21. The classifier 24 serving as the transfer function of performing a process of distributing a packet from one input source to a plurality of output destinations and transferring the packet is created by hardware and mounted in the utilization type NIC 15. Further, the merger 25 serving as the transfer function of performing a process of merging packets from a plurality of input sources and transferring a resultant packet to one output destination is created by hardware and mounted in the utilization type NIC 15.

After the server 20C transfers the packets input to the normal NIC 11 from the forwarder 28 to the classifier 24, the server 20C distributes the packets using the classifier 24 and transfers the packets to the APLs 12a to 12c. Further, the server 20C distributes the packets input to the utilization type NIC 15 using the classifier 24 and transfers the packets to the APLs 12a to 12c. After the server 20C transfers the packets from the APLs 12a to 12c to the merger 25 of the utilization type NIC 15, the server 20C transfers the packets from the merger 25 to the normal NIC 11 via the forwarder 28.

With this configuration, the packet transfer between the normal NIC 11 or the utilization type NIC 15 and the APLs 12a to 12c can be performed via the forwarder 28 of the virtual patch panel 21, and the classifier 24 and the merger 25 of the utilization type NIC 15. Therefore, the server can use a bandwidth that is a sum of a network bandwidth of the normal NIC 11 and a network bandwidth of the accelerator utilization type NIC 15. This allows a network bandwidth available to the server to be increased.

Further, because in the packet transfer between the normal NIC 11 or the utilization type NIC 15 and the APLs 12a to 12c, the packet is transferred to the APLs 12a to 12c via only the classifier 24 or only the merger 25 of the utilization type NIC 15, the processing of the APLs 12a to 12c is not limited. That is, with the server of the present invention, it is possible to increase the available network bandwidth without limiting the processing of the APLs 12a to 12c.

(2) The second transfer function of the server 20C is configured as follows. In the server 20C, a plurality of classifiers 26a to 26c that perform a process of distributing and transferring a packet from one input source to a plurality of output destinations are created by software and mounted in the virtual patch panel 21. Further, in the server 20C, a plurality of mergers 27a to 27c that perform a process of merging packets from a plurality of input sources and transferring a resultant packet to one output destination are created by software and mounted in the virtual patch panel 21.

The server 20C distributes the packets input to the normal NIC 11 using the classifier 26 and outputs the packets to the plurality of mergers 27a to 27c, and distributes the packets input to the utilization type NIC 15 using the classifier 24 and outputs the packets to the plurality of mergers 27a to 27c. Then, each of the mergers 27a to 27c merges the packets from the normal NIC 11 and the utilization type NIC 15 and transfers a resultant packet to the APLs 12a to 12c. The server 20C distributes the packets of each of the APLs 12a to 12c using each of the classifiers 26, transfers some distributed packets to the normal NIC 11 via the merger 27, and transfers the other packets to the utilization type NIC 15 via the merger 25.

With this configuration, it is possible to perform the packet transfer between the normal NIC 11 or the utilization type NIC 15 and the APLs 12a to 12c via the classifiers 26a to 26c and the mergers 27a to 27c of the virtual patch panel 21 and the classifiers 24 and the merger 25 of the utilization type NIC 15. Therefore, the server 20C can use a bandwidth that is a sum of a network bandwidth of the normal NIC 11 and a network bandwidth of the accelerator utilization type NIC 15. This allows a network bandwidth available to the server 20C to be increased.

Further, the packet transfer between the normal NIC 11 or the utilization type NIC 15 and the APLs 12a to 12c is necessarily performed on a one-to-one basis between the mergers 27a to 27c of the virtual patch panel 21 and the corresponding APLs 12a to 12c. Alternatively, the packet transfer is necessarily performed on a one-to-one basis between the APLs 12a to 12c and the corresponding classifiers 26a to 26c of the virtual patch panel 21. Therefore, because packets are transferred in only one direction when viewed from the APLs 12a to 12c side, complicated processing as when packets are input to the APLs 12a to 12c in a plurality of directions is eliminated. In other words, the processing of the APLs 12a to 12c is not limited. That is, with the server of the present invention, it is possible to increase the available network bandwidth without limiting the processing of the APLs 12a to 12c.

Configuration of Fourth Embodiment

Figure 9:
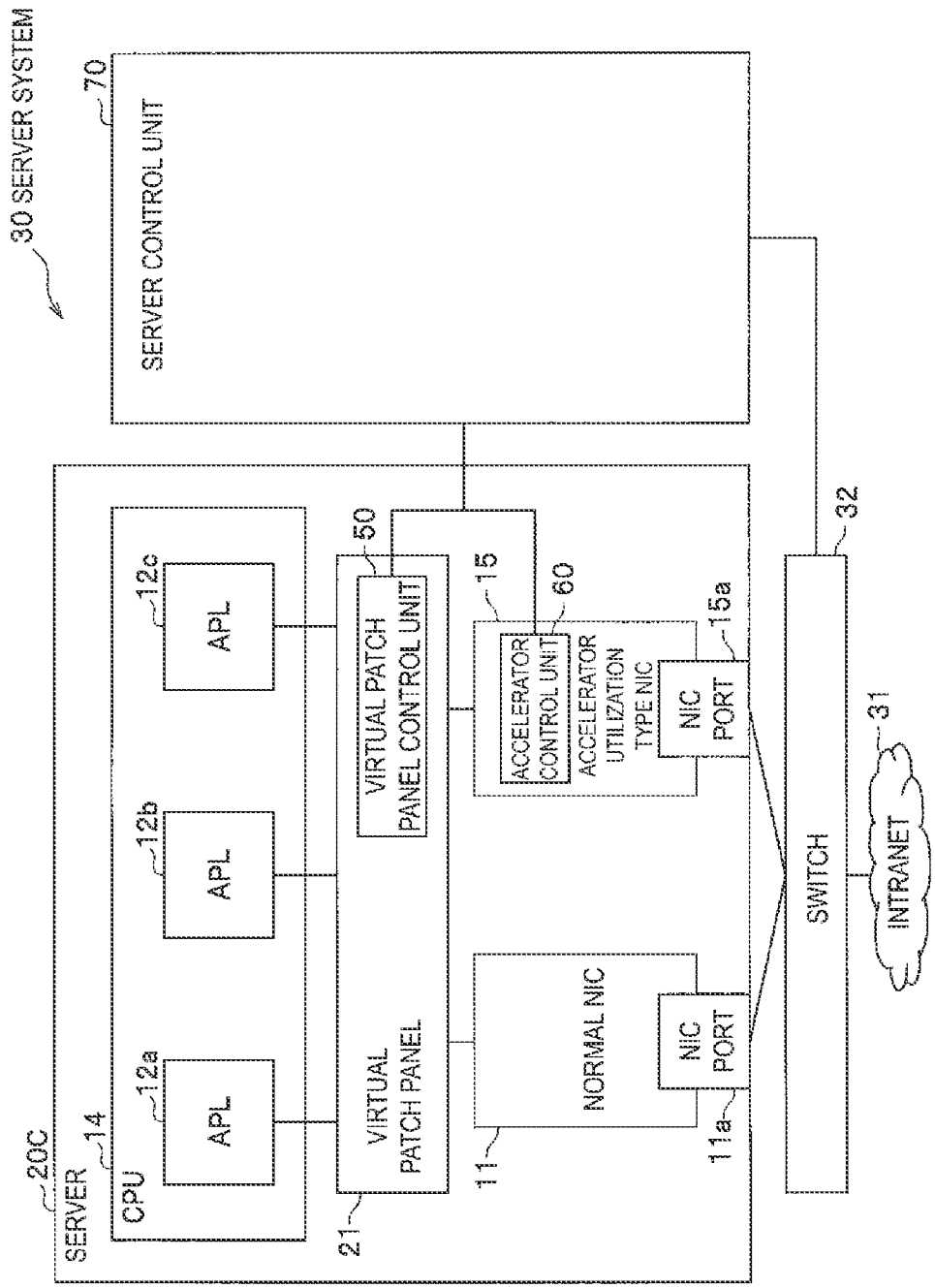
FIG. 9 is a block diagram illustrating a configuration of a server system according to a fourth embodiment of the present invention.

FIG. 9 is a block diagram illustrating a configuration of a server system according to a fourth embodiment of the present invention.

A server system 30 illustrated in FIG. 9 has a configuration in which a server 20C (FIG. 3) and a server control unit 70 is connected to an intranet (communication network) 31 that is an in-company network constructed by using an IP (Internet Protocol) protocol or the like via a switch 32. The server control unit 70 constitutes a control unit according to the aspects of the present invention.

In the server 20C, the virtual patch panel 21 includes a virtual patch panel control unit 50, and the utilization type NIC 15 includes an accelerator control unit 60.

The server control unit 70 determines an overall configuration of the server system 30 and performs control for instructing the virtual patch panel 21 and the accelerator utilization type NIC 15 to change a configuration.

The virtual patch panel control unit 50 performs control for changing the configuration of the virtual patch panel 21 according to the instruction from the server control unit 70.

The accelerator control unit 60 performs control for changing the configuration of the accelerator utilization type NIC 15 according to the instruction from the server control unit 70.

Figure 10:
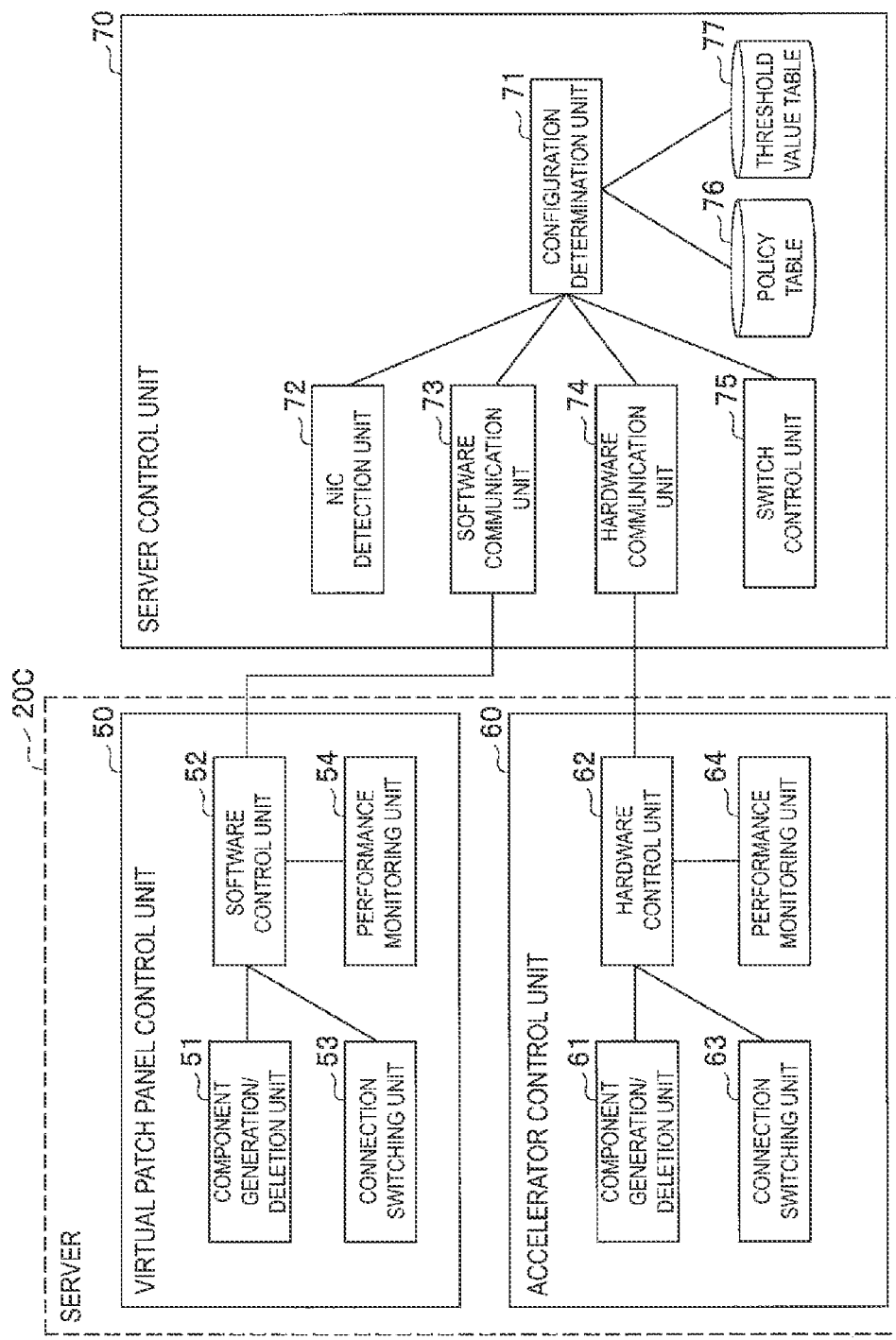
FIG. 10 is a block diagram illustrating a configuration of a server control unit, and a virtual patch panel control unit and an accelerator control unit in the server in the server system.

The server control unit 70 includes a configuration determination unit 71, an NIC detection unit 72, a software communication unit 73, a hardware communication unit 74, a switch control unit 75, a policy table 76, and a threshold value table 77, as illustrated in FIG. 10.

The virtual patch panel control unit 50 includes a component generation/deletion unit (also referred to as a generation/deletion unit) 51, a software control unit 52, a connection switching unit 53, and a performance monitoring unit 54.

The generation/deletion unit 51 performs a process of generating or deleting the classifier 26, the merger 27, and the forwarder 28, as will be described below. The generation is to cause the classifier 26, the merger 27, and the forwarder 28 to individually enter an available state. The deletion is to cause the classifier 26, the merger 27, and the forwarder 28 to individually enter a stopped state, thereby saving an amount of usage of the cores of the CPU 14.

The software control unit 52 performs control for transmitting a performance request of software to the performance monitoring unit 54 and receiving a performance response of software from the performance monitoring unit 54. Further, the software control unit 52 performs control for receiving a software performance request, which is a performance request of software, from the configuration determination unit 71 via the software communication unit 73, and transmitting a software performance response to the configuration determination unit 71 via the software communication unit 73, the performance monitoring unit 54 performs monitoring of the transfer function of the virtual patch panel 21, or the like.

The connection switching unit 53 performs a processing of switching a connection relationship among the classifier 26, the merger 27, and the forwarder 28 as described about packet input and output using the arrows in FIGS. 5 to 8.

The accelerator control unit 60 includes a component generation/deletion unit 61, a hardware control unit 62, a connection switching unit 63, and a performance monitoring unit 64.

The generation/deletion unit 61 performs a process of generating or deleting the classifier 24 and the merger 25. The connection switching unit 63 performs a process of switching a connection relationship between the classifier 24 and the merger 25, as described about packet input and output using the arrows in FIGS. 5 to 8.

The hardware control unit 62 performs control for transmitting a performance request for hardware to the performance monitoring unit 64 and receiving a performance response for hardware from the performance monitoring unit 64. Further, the hardware control unit 62 performs control for receiving a hardware performance request, which is a hardware performance request, from the configuration determination unit 71 via the hardware communication unit 74, and transmitting a hardware performance response to the configuration determination unit 71 via the hardware communication unit 74. The performance monitoring unit 64 performs monitoring of the transfer function of the utilization type NIC 15, or the like.

In the policy table 76, a value "1" is associated with an attribute "software performance weight" (to be described below) as a policy, as illustrated in FIG. 11. Similarly, a value "0.8" is associated with an attribute "CPU resource weight", and a value "1.2" is associated with an attribute "performance suitability weight" (to be described below).

In the threshold value table 77, a value "50 Gbps" is associated with an attribute "performance threshold value" (to be described below) as a policy, a value of "0.5" is associated with an attribute "first suitability threshold value" (to be described below), and a value "0.5" is associated with an attribute "second suitability threshold value" (to be described below), as illustrated in FIG. 12.

Operation of Fourth Embodiment

Next, an operation of the server system 30 when a request for addition of a normal NIC is made will be described with reference to a flowchart illustrated in FIG. 13 and a sequence diagram illustrated in FIG. 14. Here, the description will be given for an operation when a request for addition of the normal NIC 11 is made, for example, in a case in which the NW bandwidth becomes insufficient while the server 20C is operating.

Figure 13:
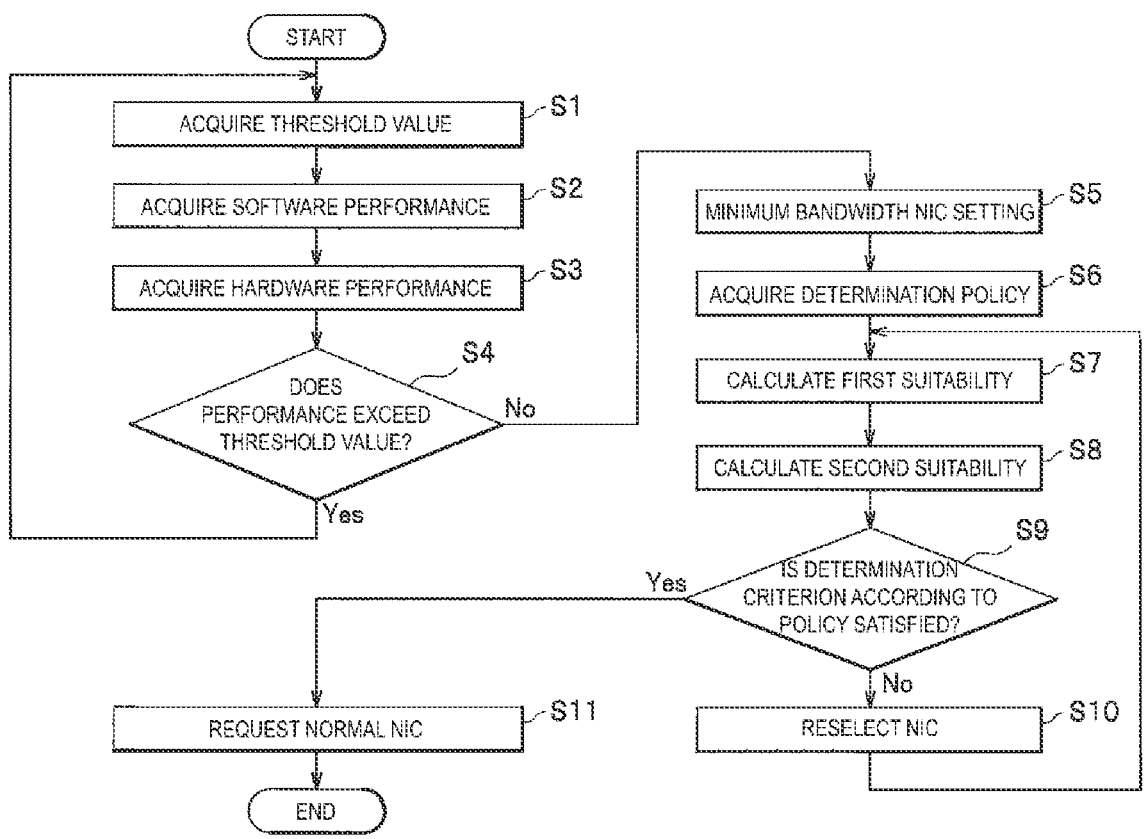
FIG. 13 is a flowchart illustrating an operation w % ben a request for addition of a normal NIC is made in the server system.
Figure 14:
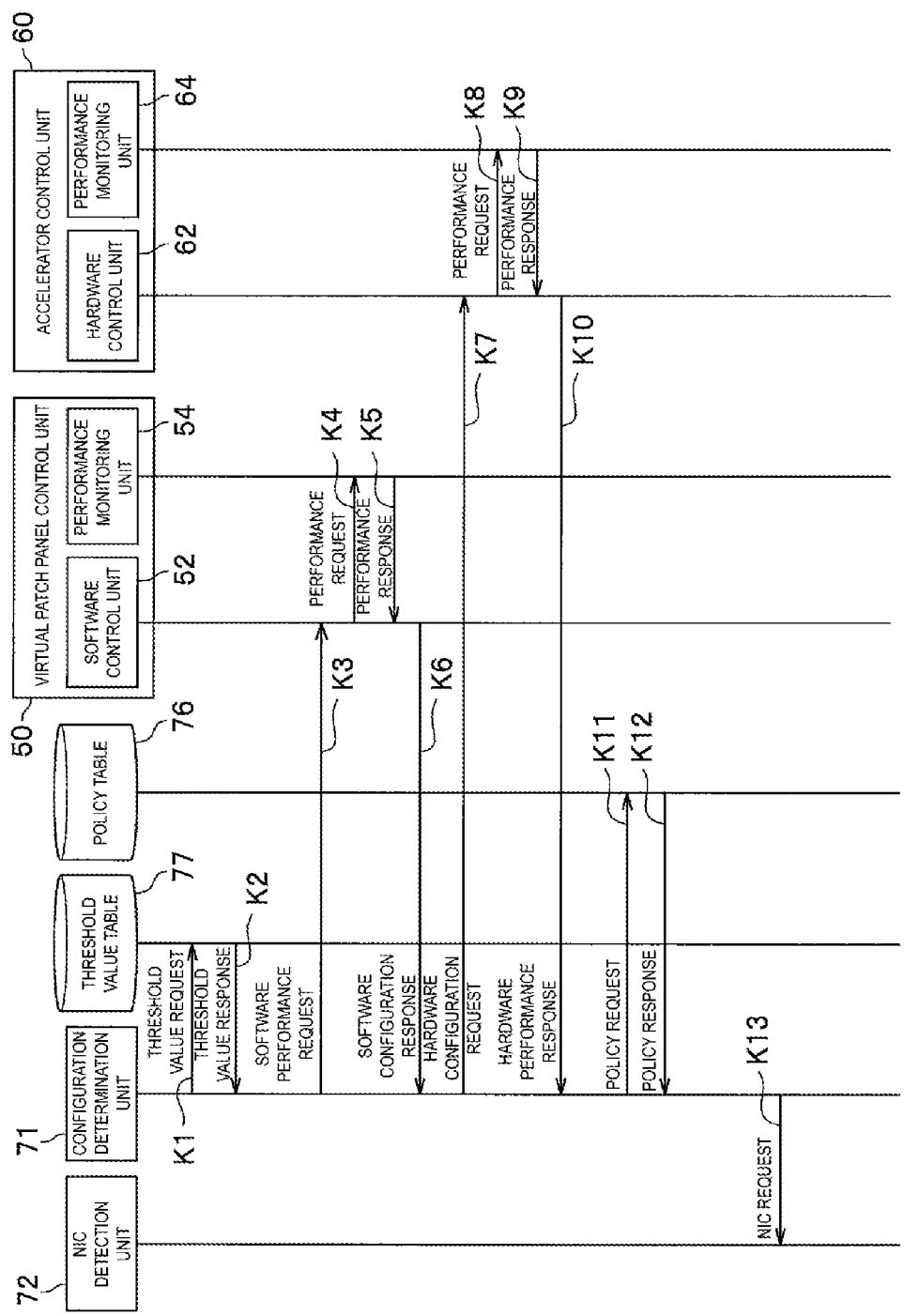
FIG. 14 is a sequence diagram illustrating an operation when a request for addition of a normal NIC is made in the server system.

In step S1 illustrated in FIG. 13, the configuration determination unit 71 of the server control unit 70 acquires a threshold value. This process is performed by the configuration determination unit 71 sending a threshold value request (K1) to the threshold value table 77 and the threshold value table 77 responding with a threshold value (a threshold value response) (K2) in response to the request (K1), as illustrated in FIG. 14. Here, it is assumed that all the threshold values shown in the threshold value table 77 in FIG. 12 have been acquired.

Then, in step S2 of FIG. 13, the configuration determination unit 71 inquires current software performance from the virtual patch panel control unit 50. This is an inquiry about performance such as transfer performance of the classifier 26, the merger 27, and the forwarder 28 created by software and mounted in the virtual patch panel 21, as illustrated in FIG. 3.

This inquiry process is performed as follows. As illustrated in FIG. 14, the software performance request (K3) from the configuration determination unit 71 is made to the software control unit 52 of the virtual patch panel control unit 50 via the software communication unit 73 (FIG. 10), and the software control unit 52 requests the performance monitoring unit 54 for software performance (performance request) (K4) in response to the request (K3). In response to this request (K4), the performance monitoring unit 54 responds with the software performance (performance response) (K5). With this response (K5), the software control unit 52 responds to the configuration determination unit 71 with the software performance (software performance response) (K6) via the software communication unit 73 (FIG. 10).

Then, in step S3 illustrated in FIG. 13, the configuration determination unit 71 inquires current hardware performance from the utilization type NIC 15. This is an inquiry about performance such as transfer performance of the classifier 24 and the merger 25 created by hardware and mounted in the utilization type NIC 15, as illustrated in FIG. 3.

This inquiry process is performed as follows. As illustrated in FIG. 14, a hardware performance request (K7) is sent from the configuration determination unit 71 to the hardware control unit 62 of the accelerator control unit 60 via the hardware communication unit 74 (FIG. 10), and, in response thereto (K7), the hardware control unit 62 requests the performance monitoring unit 64 for hardware performance (performance request) (K8). In response to this request (K8), the performance monitoring unit 64 responds with the hardware performance (a performance response) (K9). In response to this response (K9), the hardware control unit 62 responds to the configuration determination unit 71 with the hardware performance via the hardware communication unit 74 (FIG. 10) (a hardware performance response) (K10).

Then, in step S4 illustrated in FIG. 13, the configuration determination unit 71 determines whether the software performance and the hardware performance exceed the threshold values. This determination is performed using the performance threshold value "50 Gbps" acquired in step S1 above. For example, when a sum of a transferable capacity that is the software performance and a transferable capacity that is the hardware performance exceeds the threshold value "50 Gbps" as a result of this determination, the normal NIC is not required and the process returns to step S1.

On the other hand, when it is determined that the sum of the software performance and the hardware performance is equal to or smaller than the threshold value, the normal NIC is required and thus, the process proceeds to step S5.

In step S5, the configuration determination unit 71 performs a setting of a minimum bandwidth NIC. This setting is to set the normal NIC having a NW bandwidth of a minimum specification from among normal NICs existing as an option in the server 20C. In this setting, the NW bandwidth is gradually increased from the minimum specification such that a normal NIC having an optimal NW bandwidth is set.

Then, in step S6, the configuration determination unit 71 acquires a policy from the policy table 76 illustrated in FIG. 11. Here, it is assumed that a value of each weight serving as a policy described in an attribute field shown in the policy table 76 is acquired. The CPU resource weight indicates which of resource usage amounts of the CPU and the accelerator is to be prioritized. The performance suitability weight, for example, indicates, by a weight, which of the resource usage amount and the performance is to be prioritized when the configuration of the first transfer function described above is applied.

The configuration determination unit 71 then performs a first suitability calculation in step S7. This is to calculate the suitability of the NW bandwidth of the normal NIC set in step S5 when the configuration of the first transfer function described above is applied to the server 20C.

The first suitability calculation is performed with suitability=Min (performance suitability*performance suitability weight, resource suitability). The resources are CPU resources. In the above equation, a smaller of a calculation result of "performance suitability*performance suitability weight" and a calculation result of "resource suitability" that are separated by commas is obtained as the suitability.

The calculation of the suitability is actually performed using Equations (1) and (2) below.

$$\text{Performance suitability} = (\text{software prediction performance} + \text{hardware prediction performance}) - \text{performance threshold value} \quad (1)$$

$$\text{Resource suitability} = \text{Min}(\text{unused CPU resource amount} * \text{CPU resource weight}, \text{unused accelerator resource amount}) \quad (2)$$

Equation (1) is an equation for obtaining a difference between the performance threshold value and a sum of the software prediction performance and the hardware prediction performance as the performance suitability.

Equation (2) is an equation for obtaining a smaller one of a calculation result of "unused CPU resource amount*CPU resource weight" and a calculation result of "unused accelerator resource amount" as the resource suitability.

That is, when the configuration of the first transfer function described above is applied to the server 20C, the configuration determination unit 71 calculates the suitability (first suitability) of the NW bandwidth of the normal NIC set in step S5 using Equations (1) and (2).

In step S8, the configuration determination unit 71 then performs a second suitability calculation. That is, when the configuration of the second transfer function described above is applied to the server 20C, the configuration determination unit 71 calculates suitability (second suitability) of the NW bandwidth of the normal NIC set in step S5 using Equations (1) and (2).

In step S9, the configuration determination unit 71 then determines whether or not the calculated first suitability and second suitability satisfy a determination criterion according to a policy. That is, the configuration determination unit 71 determines whether or not the first suitability exceeds the first suitability threshold value "0.5" acquired in step S1 and the second suitability exceeds the second suitability threshold value "0.5".

As a result, when both the first suitability and the second suitability are equal to or smaller than the threshold value "0.5", the configuration determination unit 71 reselects the normal NIC having a wider NW bandwidth than a current NW bandwidth in step S10, returns to step S7 above, and performs calculation.

On the other hand, when both or any one of the first and second suitability exceeds the threshold value "0.5" as a result of the determination in step S9, the configuration determination unit 71 make a request for addition of the normal NIC in step S1. This is the following operation. That is, the configuration determination unit 71 sends a request for addition of the normal NIC (an NIC request) (K13) to the NIC detection unit 72, as illustrated in FIG. 14. This request reaches an operator, the operator adds the normal NIC, and the NIC detection unit 72 detects this.

Next, an operation when the normal NIC is added in response to the request of the normal NIC described above will be described with reference to the flowchart illustrated in FIG. 15.

Figure 15:
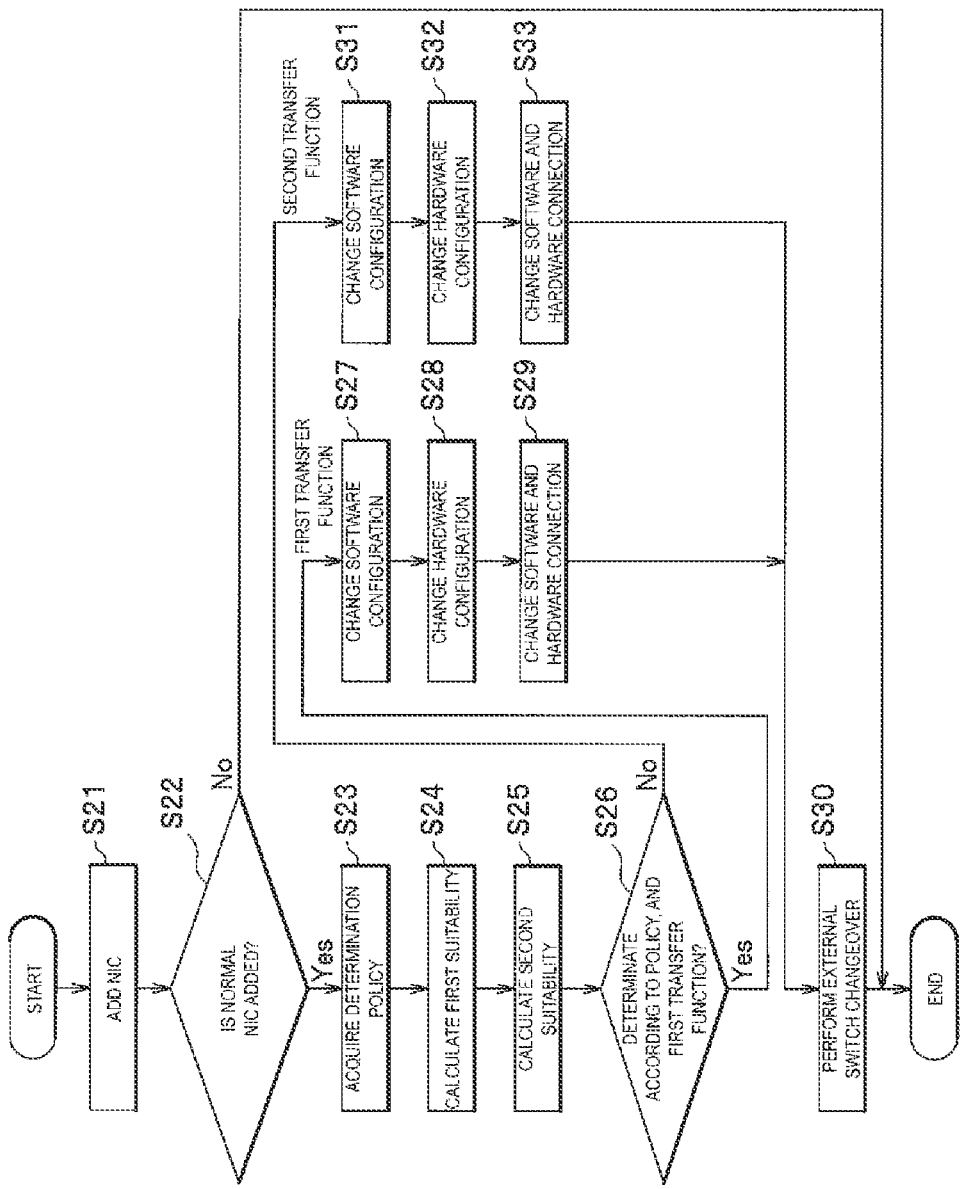
FIG. 15 is a flowchart diagram illustrating an operation when a normal NIC is added in response to a request from the normal NIC in the server system.
Figure 16:
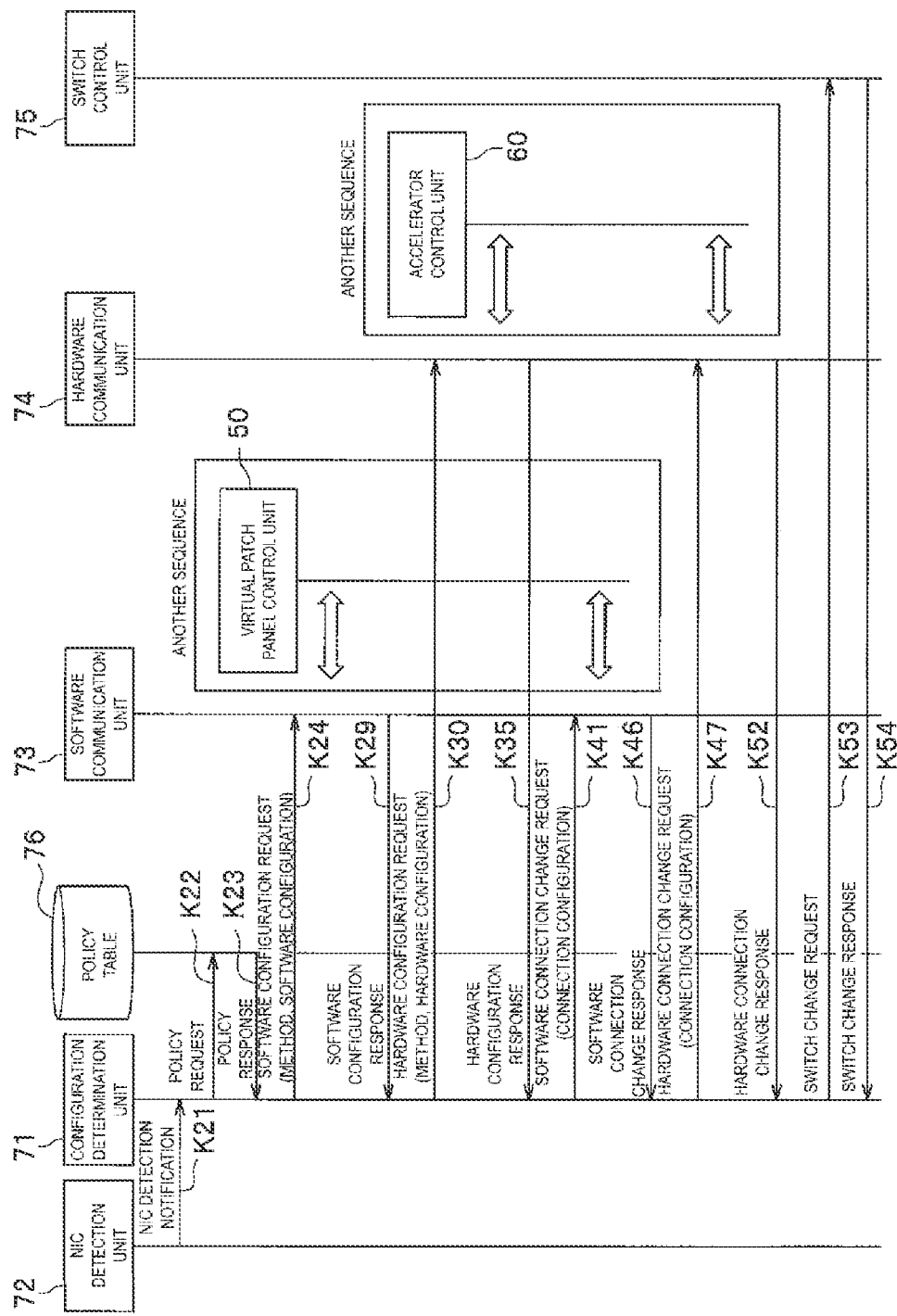
FIG. 16 is a first sequence diagram illustrating an operation when a normal NIC is added in response to a request from the normal NIC in the server system.

In step S21 illustrated in FIG. 15, addition of the normal NIC is performed. The NIC detection unit 72 notifies the configuration determination unit 71 that the added normal NIC has been detected (NIC detection notification) (K21), as illustrated in FIG. 16.

In step S22, the configuration determination unit 71 determines whether or not the added one is the normal NIC.

When the added one is not the normal NIC as a result of this determination, this processing ends.

In the case of the normal NIC, a determination policy is acquired in step S23. The configuration determination unit 71 sends a policy request (K22) to the policy table 76, and the policy table 76 responds with the policy (a policy response) (K23), as illustrated in FIG. 16. This allows the configuration determination unit 71 to acquire and hold the policy.

In step S24 of FIG. 15, the configuration determination unit 71 then performs the first suitability calculation that is the same as in step S7 (FIG. 13). That is, the configuration determination unit 71 calculates the suitability of the NW bandwidth of the normal NIC when the software and hardware configurations of the first transfer function are applied.

In step S25 of FIG. 15, the configuration determination unit 71 then performs the second suitability calculation that is the same as in step S8 (FIG. 13). That is, the configuration determination unit 71 calculates the suitability of the NW bandwidth of the normal NIC when the software and hardware configurations of the second transfer function are applied.

Then, in step S26 of FIG. 15, the configuration determination unit determines whether or not the first transfer function has a higher suitability than the second transfer function.

Accordingly, when the suitability of the first transfer function is higher, software configuration change is performed in step S27. That is, the configuration of the virtual patch panel 21 is changed as follows due to the addition of the normal NIC.

That is, the configuration determination unit 71 sends a request for software configuration of the first transfer function (a software configuration request) (K24) to the software communication unit 73, as illustrated in FIG. 16.

In FIG. 16, a software configuration request (method, software configuration) (K24) is described, but this is a request (K24) for a software configuration of the first transfer function (method) or a request (K24) for a software configuration of the second transfer function (method).

Figure 17:
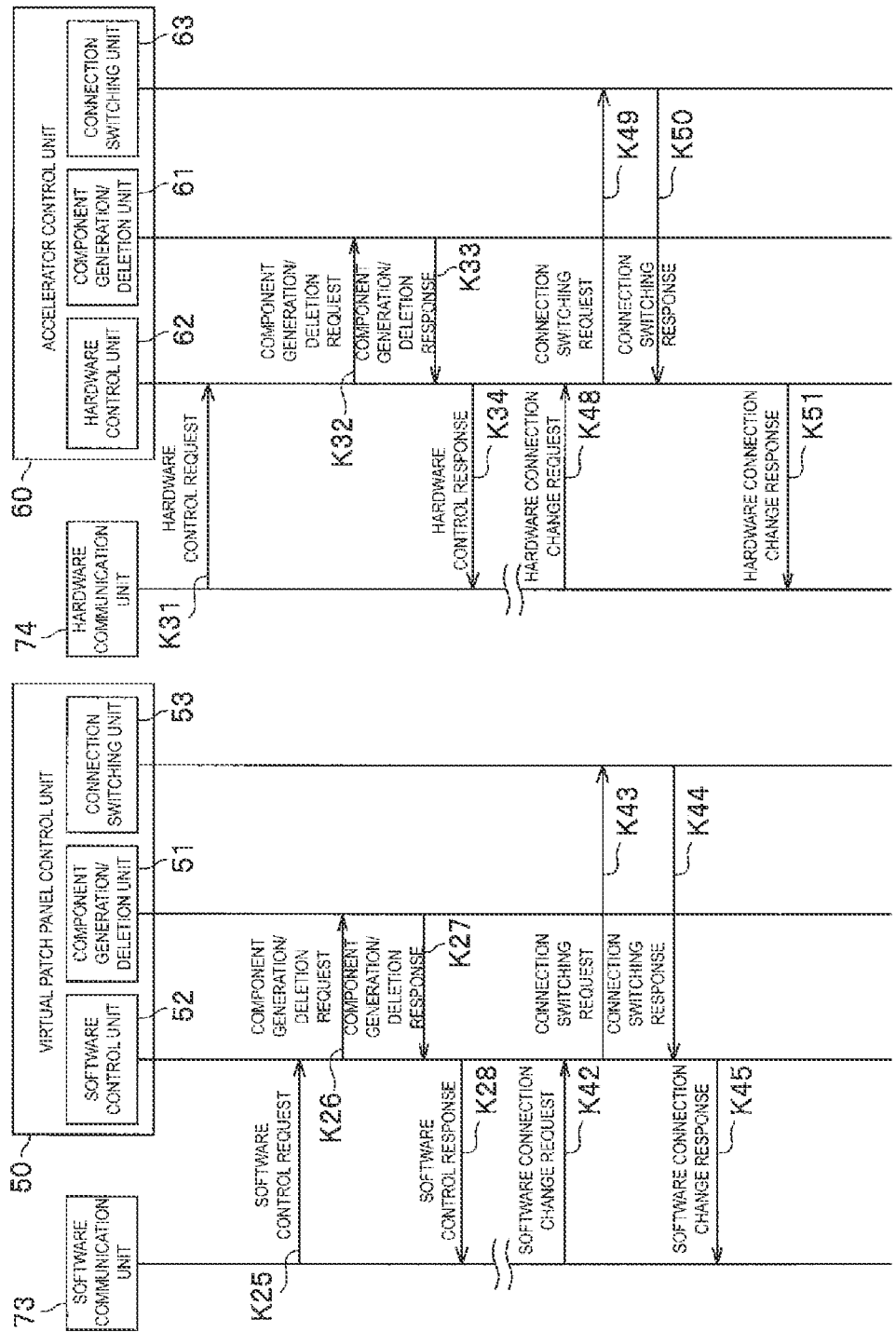
FIG. 17 is a second sequence diagram illustrating an operation when a normal NIC is added in response to a request from the normal NIC in the server system.
Figure 18:
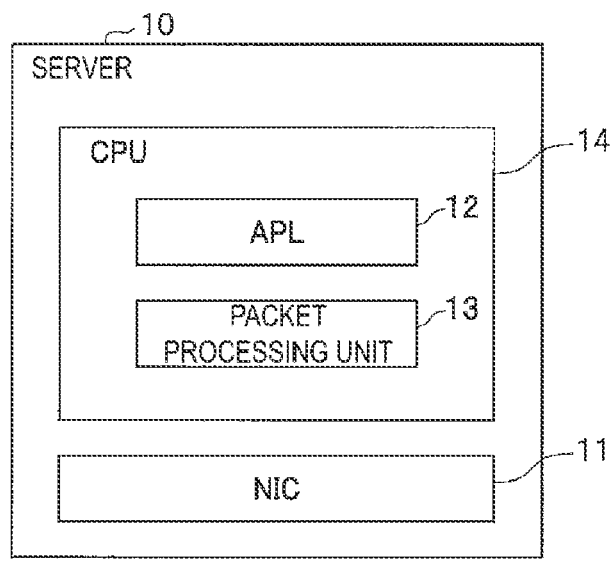
FIG. 18 is a block diagram illustrating a configuration of a server including an NIC in the related art.
Figure 19:
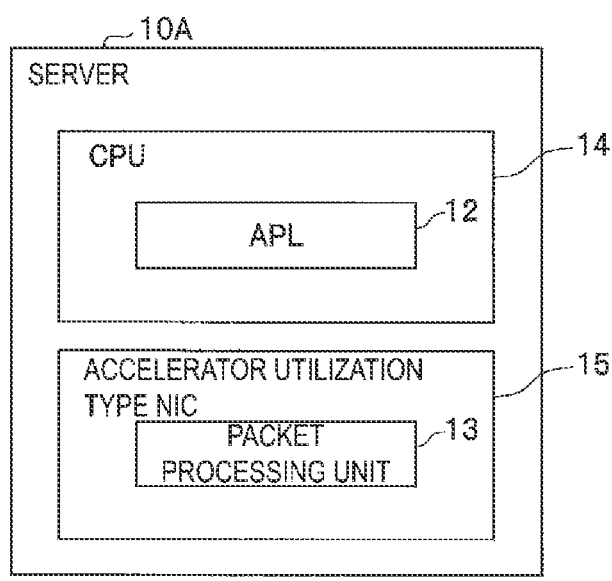
FIG. 19 is a block diagram illustrating a configuration of a server including an accelerator utilization type NIC in the related art.

The software communication unit 73 sends a software control request (K25) for performing the software configuration of the first transfer function to the software control unit 52 of the virtual patch panel control unit 50, as illustrated in FIG. 17. The software control unit 52 sends a component generation request (K26) to the component generation/deletion unit 51.

In FIG. 17, a component generation/deletion request (K26) is described, but this means that a component generation request (K26) or a component deletion request (K26) is made. Another description of "generation/deletion" also has a meaning of "generation or deletion".

In response to the component generation request (K26), the generation/deletion unit 51 performs a process of generating all or part of the classifier 26, the merger 27, and the forwarder 28 (performing the software configuration) in the virtual patch panel 21. After this processing, the generation/deletion unit 51 notifies the software control unit 52 of a component generation response (K27), and the software control unit 52 notifies the software communication unit 73 of a software control response (K28).

The software communication unit 73 notifies the configuration determination unit 71 of a software configuration response (K29) indicating that the software configuration has been executed, as illustrated in FIG. 16.

Then, in step S28, hardware configuration change is performed. That is, a configuration of the utilization type NIC 15 is changed as follows according to the addition of the normal NIC.

That is, as illustrated in FIG. 16, the configuration determination unit 71 sends a request for a hardware configuration of the first transfer function (a hardware configuration request) (K30) to the hardware communication unit 74.

In FIG. 16, the hardware configuration request (method, hardware configuration) (K30) is described, but this is a request (K30) for a hardware configuration of the first transfer function (method) or a request (K30) for a hardware configuration of the second transfer function (method).

As illustrated in FIG. 17, the hardware communication unit 74 sends a hardware control request (K31) for performing the hardware configuration of the first transfer function to the hardware control unit 62 of the accelerator control unit 60. The hardware control unit 62 sends a component generation request (K32) to the component generation/deletion unit 61.

In response to the component generation request (K32), the generation/deletion unit 61 performs a process of generating all or part of the classifier 24 and the merger 25 (performing the hardware configuration) in the utilization type NIC 15. After this process, the generation/deletion unit 61 notifies the hardware control unit 62 of a component generation response (K33), and the hardware control unit 62 notifies the hardware communication unit 74 of a hardware control response (K34).

The hardware communication unit 74 notifies the configuration determination unit 71 of a hardware configuration response (K35) indicating that the hardware configuration has been executed, as illustrated in FIG. 16.

Then, in step S29 of FIG. 15, software and hardware connection change is performed.

That is, the configuration determination unit 71 sends a request for connection change of the software configuration of the first transfer function (a software connection change request) (K41) to the software communication unit 73, as illustrated in FIG. 16.

The software communication unit 73 sends a software connection change request (K42) for performing software connection change of the first transfer function to the software control unit 52 of the virtual patch panel control unit 50, as illustrated in FIG. 17. The software control unit 52 sends a connection switching request (K43) to the connection switching unit 53.

The connection switching unit 53 performs connection change of all or some of the classifier 26, the merger 27, and the forwarder 28 of the virtual patch panel 21 in response to the connection switching request (K43). After this processing, the connection switching unit 53 notifies the software control unit 52 of a connection switching response (K44), and the software control unit 52 notifies the software communication unit 73 of a software connection change response (K45).

The software communication unit 73 notifies the configuration determination unit 71 of a software connection change response (K46) indicating that the software connection configuration change has been executed, as illustrated in FIG. 16.

Then, the configuration determination unit 71 sends a request for connection change of the hardware configuration of the first transfer function (a hardware connection change request) (K47) to the hardware communication unit 74, as illustrated in FIG. 16.

The hardware communication unit 74 sends a hardware connection change request (K48) for performing hardware connection change of the first transfer function to the hardware control unit 62 of the accelerator control unit 60, as illustrated in FIG. 17. The hardware control unit 62 sends a connection switching request (K49) to the connection switching unit 63.

The connection switching unit 63 performs a connection change of all or part of the classifier 26 and the merger 27 of the utilization type NIC 15 in response to the connection switching request (K49). After this processing, the connection switching unit 63 notifies the hardware control unit 62 of a connection switching response (K50), and the hardware control unit 62 notifies the hardware communication unit 74 of a hardware connection change response (K51).

The hardware communication unit 74 notifies the configuration determination unit 71 of a hardware connection change response (K52) indicating that the hardware connection configuration change has been executed, as illustrated in FIG. 16.

Then, in step S30 illustrated in FIG. 15, an external switch switching is performed. This is for the switch control unit 75 illustrated in FIG. 10 to control the switch 32 illustrated in FIG. 9 to perform a switching operation such that packets from an intranet 31 are input to and output to the added normal NIC.

That is, the configuration determination unit 71 sends a switch switching request (K53) to the switch control unit 75, as illustrated in FIG. 16. The switch control unit 75 that has received this request (K53) performs a switching operation such that packets from the intranet 31 are input to and output from the added normal NIC, and notifies the configuration determination unit 71 of a switch switching response (K54).

On the other hand, when it is determined in step S26 of FIG. 15 that the second transfer function has a higher suitability, the software configuration change of the second transfer function is performed in step S31. Because this change is performed in the same procedure as in the software configuration change relevant to the first transfer function described in step S27, description thereof will be omitted.

Then, in step S32, hardware configuration change relevant to the second transfer function is performed. Because this change is performed in the same procedure as in the hardware configuration change relevant to the first transfer function described in step S28, description thereof will be omitted.

Then, in step S33, software and hardware connection change relevant to the second transfer function is performed. Because this change is performed in the same procedure as the software and hardware connection change relevant to the first transfer function described in step S29, the description thereof will be omitted.

Then, in step S30, the switch control unit 75 controls the switch 32 to perform a switching operation such that a packet is input and output from the intranet 31 to and from the normal NIC added according to the second transfer function. This switching operation is performed by the processing of K53 and K54 illustrated in FIG. 16, as in the case of the first transfer function described above.

Effects of Fourth Embodiment

Effects of the server system 30C according to the fourth embodiment will be described. The server system 30C includes the server 20C described above and a server control unit 70 that controls the server 20C. This server system 30 has the following characteristic configuration.

(1) When a sum of a performance including a packet transfer capacity of the first transfer function and a performance including a packet transfer capacity of the second transfer function is equal to or smaller than a predetermined performance threshold value, the server control unit 70 performs the following processing. The following processing is that the server control unit 70 makes a request for addition of a normal NIC that is an addition target when a network bandwidth of the normal NIC that is an addition target is suitable for a network bandwidth required for both or any one of the configuration of the first transfer function and the configuration of the second transfer function. Here, the first transfer function is the classifier 26, the merger 27, and the forwarder 28 mounted in the virtual patch panel 21 of the server 20C by software. Further, the second transfer function is the classifier 24 and the merger 25 mounted in the utilization type normal NIC 15 by hardware.

With this configuration, for example, when a network bandwidth is further required for the server 20C, the server control unit 70 can determine whether or not the normal NIC as an addition target can be added and make a request for addition of the normal NIC.

(2) The server control unit 70 performs control for configuring the transfer function in which the suitability to the network bandwidth becomes high due to a normal NIC to be added when the normal NIC according to the request for addition of a normal NIC is added to the configuration of the first transfer function or the second transfer function of the server 20C, to the server 20C.

With this configuration, the normal NIC can be added to the server 20C such that the network bandwidth is optimized.

In addition, a specific configuration can be appropriately changed without departing from the gist of the present invention.

REFERENCE SIGNS LIST

20A, 20B, 20C Server
11 Normal NIC
11a, 15a NIC port
12a to 12c APL
14 CPU
15 Accelerator utilization type NIC
16, 23 Target function
21 Virtual patch panel
24, 26 Classifier
25, 27 Merger
28 Forwarder
30 Server system
50 Virtual patch panel control unit
51 Component generation/deletion unit
52 Software control unit
53 Connection switching unit
54 Performance monitoring unit
60 Accelerator control unit
61 Component generation/deletion unit
62 Hardware control unit
63 Connection switching unit
64 Performance monitoring unit
70 Server control unit
71 Configuration determination unit
72 NIC detection unit
73 Software communication unit
74 Hardware communication unit
75 Switch control unit
76 Policy table
77 Threshold value table

The invention claimed is:
1. A server comprising:
a first network interface card (NIC) including an accelerator implementing a target function having at least a data transfer function;
a second NIC on which the accelerator is configured and having an expansion function for connection to a communication network;
a processor that performs processing according to an application; and
a virtual patch panel having a transfer function configured to control packet transfer between the first NIC and the second NIC, the transfer function being implemented by software executed by the processor,
wherein the server is configured to:
distribute and transfer data in a packet input from the communication network to the first NIC, and from the first NIC to a target application after processing the data using the target function, and
transmit a packet relevant to processing of the application from the first NIC to the communication network via the target function, and
wherein, based on a packet input from the communication network to the second NIC being transferred between the second NIC and the first NIC via the virtual patch panel, the target function of the first NIC is configured to transfer the packet to and from the application.
2. The server according to claim 1,
wherein the virtual patch panel includes a first input/output terminal and a second input/output terminal for packets,
wherein the accelerator is configured to implement server includes a second target function having the same function as the target function,
wherein the application is connected to the first input/output terminal of the virtual patch panel, and the second target function and the target function connected to the second NIC are connected to the second input/output terminal, and
wherein, based on a packet being transferred between both of the second target function via the second NIC and the target function on the first NIC, and the application, the packet is transferred between the application and the first input/output terminal of the virtual patch panel and the packet is transferred between both of the second target function and the target function and the second input/output terminal.
3. The server according to claim 1,
wherein a forwarder, created by software and mounted in the virtual patch panel, is configured to transfer a packet from one input source to one output destination,
wherein (i) a classifier, created by hardware and mounted in the first NIC, is configured to serve as a transfer function for distributing and transferring a packet from one input source to a plurality of output destinations and (ii) a merger created by hardware and mounted in the first NIC, is configured to serve as a transfer function of merging packets from a plurality of input sources and transfer a merged packet to one output destination,
wherein, after the packet input to the NIC is transferred from the forwarder to the classifier, the packet input to the second NIC is distributed by the classifier and transferred to the application, and the packet input to the first NIC is distributed by the classifier and transferred to the application, and wherein, after a packet from the application is transferred to the merger of the first NIC, the packet from the application is transferred from the merger to the second NIC via the forwarder.
4. The server according to claim 1,
wherein (i) a plurality of classifiers, created by software and mounted in the virtual patch panel, are configured to serve as a transfer function for distributing and transferring a packet from one input source to a plurality of output destinations and (ii) a plurality of mergers, created by software and mounted in the virtual patch panel, are configured to serve as a transfer function of merging packets from a plurality of input sources and transfer a merged packet to one output destination,
wherein (i) a classifier, created by hardware and mounted in the first NIC, is configured to serve as a data transfer function for distributing and transferring the packet from the one input source to the plurality of output destinations and (ii) a merger, created by hardware and mounted in the first NIC, is configured to serve as a data transfer function of merging packets from the plurality of input sources and transfer a merged packet to one output destination,
wherein the packet input to the NIC is distributed by one of the plurality of classifiers of the virtual patch panel and output to the plurality of mergers of the virtual patch panel, the packet input to the first NIC is distributed by the classifier of the first NIC and output to the plurality of mergers, and each of the mergers is configured to merge the packet from the second NIC and the packet from the first NIC and transfer the merged packet to the application, and
wherein a packet from each application is distributed by each of the plurality of classifiers of the virtual patch panel, one of the distributed packets is transferred to the second NIC via the merger of the virtual patch panel, and the other packet is transferred to the merger of the first NIC.
5. A server system comprising:
a server including:
a first network interface card (NIC) including an accelerator implementing a target function having at least a data transfer function,
a second NIC on which the accelerator is configured and having an expansion function for connection to a communication network,
a processor that performs processing according to an application, and
a virtual patch panel having a transfer function configured to control packet transfer between the first NIC and the second NIC, the transfer function being implemented by software executed by the processor,
wherein the server is configured to:
distribute and transfer data in a packet input from the communication network to the first NIC, and from the first NIC to a target application after processing the data using the data transfer function, and
transmit a packet relevant to processing of the application from the first NIC to the communication network via the target function; and
a control unit configured to control the server,
wherein (i) a plurality of forwarders, created by software and mounted in the virtual patch panel, are configured to serve as the transfer function of transferring the packet from one input source to one output destination, (ii) a plurality of classifiers, created by software and mounted in the virtual patch panel, are configured to serve as a transfer function for distributing and transferring a packet from one input source to a plurality of output destinations, and (iii) a plurality of mergers, created by software and mounted in the virtual patch panel, are configured to serve as a transfer function of merging packets from a plurality of input sources and transfer a merged packet to one output destination, and wherein (i) a classifier, created by hardware and mounted in the first NIC, is configured to serve as a data transfer function for distributing and transferring the packet from one input source to a plurality of output destinations and (ii) a merger, created by hardware and mounted in the first NIC, is configured to serve as a data transfer function of merging packets from a plurality of input sources and transfer a merged packet to one output destination, and wherein the control unit is configured to perform a request for addition of a second NIC as an addition target based on both or any one of (i) a performance including a packet transfer capacity of a first transfer function including the plurality of forwarders in the virtual patch panel of the server and the classifier and the merger and (ii) a performance including a packet transfer capacity of a second transfer function including the classifier and the merger in the first NIC being equal to or less than a predetermined threshold value of a performance, and a network bandwidth of the second NIC as an addition target is suitable for a network bandwidth required for both or any one of a configuration of the first transfer function and a configuration of the second transfer function.

6. The server system according to claim 5, wherein the control unit is configured to perform control for configuring, in the server, the first transfer function or the second transfer function in which suitability of the network bandwidth becomes high due to a third NIC to be added to the configuration of the first transfer function or the second transfer function of the server in response to the request for addition of the third NIC.

7. A method of increasing a network bandwidth of a server including a first network interface card (NIC) including an accelerator implementing a target function having at least a data transfer function, a second NIC on which the accelerator is configured and having an expansion function for connection to a communication network, a processor that performs processing according to an application, and a virtual patch panel having a transfer function configured to control packet transfer between the first NIC and the second NIC, the transfer function being implemented by software executed by the processor, the server configured to distribute and transfer data in a packet input from the communication network to the first NIC, and from the first NIC to a target application after processing the data using the target function, and transmit a packet relevant to processing of the application from the first NIC to the communication network via the target function, wherein the method comprises transferring, by the target function of the first NIC, a packet input from the communication network to the second NIC to and from the application based on the packet being transferred between the second NIC and the first NIC via the virtual patch panel.

8. The method of increasing a network bandwidth of a server according to claim 7, wherein the virtual patch panel includes a first input/output terminal and a second input/output terminal for packets, wherein the accelerator is configured to implement a second target function having the same function as the target function, wherein the application is connected to the first input/output terminal of the virtual patch panel, and the second target function and the target function connected to the second NIC are connected to the second input/output terminal, and wherein, based on a packet being transferred between both of the second target function via the second NIC and the target function on the first NIC, and the application, the packet is transferred between the application and the first input/output terminal of the virtual patch panel and the packet is transferred between both of the second target function and the target function and the second input/output terminal.

* * * * *